US012662179B2

(12) United States Patent
Vangura

(10) Patent No.: US 12,662,179 B2
(45) Date of Patent: Jun. 23, 2026

(54) MOTORIZED DOLLY FOR HEAVY LOADS AND METHOD FOR MOVING NATURAL AND ENGINEERED STONE SLABS

(71) Applicant: Vangura Kitchen Tops, Inc., North Huntingdon, PA (US)

(72) Inventor: Edward P. Vangura, North Huntingdon, PA (US)

(73) Assignee: Vangura Kitchen Tops, Inc., North Huntingdon, PA (US)

( * ) Notice: Subject to any disclaimer, the term of this patent is extended or adjusted under 35 U.S.C. 154(b) by 240 days.

(21) Appl. No.: 18/428,670

(22) Filed: Jan. 31, 2024

(65) Prior Publication Data

US 2024/0253682 A1     Aug. 1, 2024

Related U.S. Application Data

(60) Provisional application No. 63/482,398, filed on Jan. 31, 2023.

(51) Int. Cl.
B62B 3/04          (2006.01)
B62B 5/00          (2006.01)
B62B 5/04          (2006.01)

(52) U.S. Cl.
CPC .............. B62B 3/04 (2013.01); B62B 5/0033 (2013.01); B62B 5/049 (2013.01); B62B 2202/62 (2013.01); B62B 2203/10 (2013.01); B62B 2301/256 (2013.01)

(58) Field of Classification Search
CPC ..... B62B 5/049; B62B 5/0033; B62B 5/0036;

B62B 5/0043; B62B 5/0046; B62B 2301/256; B62B 2203/10; B62B 2203/07; B62B 2203/071; B62B 2203/073; B62B 2202/62; B62B 3/04

See application file for complete search history.

(56) References Cited

U.S. PATENT DOCUMENTS

| | | | | |
|---|---|---|---|---|
| 7,004,483 B1 * | 2/2006 | McEntee | ................. | B62B 3/008 |
| | | | | 280/43.23 |
| 8,348,287 B1 * | 1/2013 | Smith | ..................... | B62B 3/108 |
| | | | | 280/47.35 |
| 9,956,976 B1 * | 5/2018 | Akre | ..................... | B62B 5/0033 |
| 2016/0067130 A1 * | 3/2016 | Kofoed | ................. | B62B 5/0079 |
| | | | | 414/800 |
| 2017/0029003 A1 * | 2/2017 | Crowley | ............... | B62B 3/0612 |

FOREIGN PATENT DOCUMENTS

WO      WO-2016085327 A2 *  6/2016   .............. B66F 9/082

* cited by examiner

*Primary Examiner* — Timothy Hannon
(74) *Attorney, Agent, or Firm* — The Webb Law Firm

(57)     ABSTRACT

A motorized dolly for transporting at least one slab includes a base having a plurality of wheels rotatably connected to the base for moving the base along a ground surface and a drive system including at least one motor disposed in the base and coupled to at least one of the plurality of wheels configured to rotate the at least one wheel of the plurality of wheels for forward and backward movement of the base along the ground surface. The motorized dolly also includes a riser assembly connected to the base configured to extend to increase a height of the at least one slab relative to the base and the ground surface and to retract to reduce the height of the at least one slab relative to the ground surface and the base.

20 Claims, 19 Drawing Sheets

MOTORIZED DOLLY FOR HEAVY LOADS AND METHOD FOR MOVING NATURAL AND ENGINEERED STONE SLABS

CROSS REFERENCE TO RELATED APPLICATION

The present application claims the benefit of U.S. Provisional Patent Application No. 63/482,398, filed Jan. 31, 2023, the disclosure of which is hereby incorporated by reference in its entirety.

BACKGROUND OF THE INVENTION

Field of the Invention

The invention relates generally to motorized vehicles and other conveyances for moving heavy loads and, in particular, to a motorized hand truck or dolly designed to move large objects, such as slabs (e.g., natural and/or engineered stone slabs) used for countertops, to an indoor installation location, such as to a room of a commercial business or private residence.

Description of Related Art

Countertops for kitchens, bars, workspaces, desks, bathrooms, and similar locations can be made from a variety of natural and synthetic materials, including natural stone, engineered stone and other synthetic solid surface materials, and laminated constructions. Luxury and high-end installations often use natural stones, such as granite or marble, as such materials are believed to be more durable and aesthetically pleasing than manmade alternatives. Countertops formed from synthetic solid surface materials (also referred to as manufactured or engineered stone), such as Corian® manufactured by E.I. DuPont, are also available at similar high-end price points. Solid surface materials are synthetic composite materials formed from a combination of natural stone dust (e.g., marble dust), acrylic polymers, epoxy or polyester resins, and similar materials. Solid surface materials can be used to produce a seamless countertop. For example, Corian® is a solid surface material formed from a cured mixture of acrylic polymer and alumina derived from, for example, bauxite ore.

Natural and engineered stone countertops are generally believed to be more durable than laminate materials. For example, natural and engineered stone do not degrade or deform when exposed to moisture or humidity, as can occur with laminate countertops mounted to wood or composite wood substrates. In addition, natural and engineered stone can be molded or carved with a variety of ornate edge shapes desired by consumers. For example, natural stone countertops are cut from stone slabs using computer controlled cutting machinery, as is known in the art. The computer-controlled machinery is capable of carving complex curved edge profiles on edges of the countertop. Countertop pieces made from engineered stone can also be molded or fabricated to include complex shapes and edge profiles.

Following cutting, molding, carving, polishing, and/or any other fabricating steps for preparing the stone slab for use in a countertop, the cut or molded stone slab must be delivered to an installation location. Transport and delivery of natural and engineered stone slabs can be difficult due to the weight and large dimensions of countertop pieces. For example, a granite slab used for a countertop can have a height and/or width of about 5 feet to about 10 feet and can weigh over 1000 lbs. Delivery becomes even more difficult when countertop pieces must be moved through narrow doorways or hallways, up or down flights of stairs, or around other obstacles in a building to access an installation location.

Due to the weight and size of countertop pieces, teams of three or more installers are often needed to move each countertop piece manually from a delivery truck to the indoor installation location. Moving heavy and large objects can be time consuming, increasing costs for an installation project. Moving such objects can also result in damage to the countertop pieces and workplace injuries for installers tasked with moving the heavy objects. Therefore, there is a need in the art for improved delivery devices and moving methods for moving heavy loads, such as natural and engineered stone slabs or countertop pieces, to an installation location. The devices and methods of the present disclosure are intended to address such issues.

SUMMARY OF THE INVENTION

According to an aspect of the disclosure, a motorized dolly for transporting at least one slab includes a base having a plurality of wheels rotatably connected to the base for moving the base along a ground surface and a drive system including at least one motor disposed in the base and coupled to at least one of the plurality of wheels configured to rotate the at least one wheel of the plurality of wheels for forward and backward movement of the base along the ground surface. The motorized dolly also includes a riser assembly connected to the base configured to extend to increase a height of the at least one slab relative to the base and the ground surface and to retract to reduce the height of the at least one slab relative to the ground surface and the base. The motorized dolly also includes a platform pivotally and rotatably connected to the riser assembly configured to receive the at least one slab. The platform pivots relative to the riser assembly to transition the platform between a transport position, where the platform is in a substantially vertical position, and an unloading position, where the platform is in a substantially horizontal position. The motorized dolly also includes a plurality of outrigger supports having a first end connected to the base and a second end opposite the first end. The plurality of outrigger supports can be configured to be deployed to contact the ground surface for stabilizing the base and the at least one slab received by the platform. The motorized dolly also includes a turning leg rotatably connected to the base and extending downward from a bottom side of the base. The turning leg can be transitionable from a retracted position, in which the turning leg does not interfere with the forward and backward movement of the base, and an extended position, in which the turning leg lifts the base and the plurality of wheels away from the ground surface.

According to another aspect of the disclosure, a motorized dolly for transporting at least one slab includes a base having a plurality of wheels rotatably connected to the base for moving the base along a ground surface and a drive system including at least one motor disposed in the base and coupled to at least one of the plurality of wheels configured to rotate the at least one wheel of the plurality of wheels for forward and backward movement of the base along the ground surface. The motorized dolly also includes a riser assembly connected to the base configured to extend to increase a height of the at least one slab relative to the base and the ground surface and to retract to reduce the height of the at least one slab relative to the ground surface and the base and a platform pivotally and rotatably connected to the riser assembly configured to receive the at least one slab. The platform pivots relative to the riser assembly to transition the platform between a transport position, where the platform is in a substantially vertical position, and an unloading position, where the platform is in a substantially horizontal position. The motorized dolly also includes a handle assembly connected to the base. The handle assembly includes a handle configured to be grasped by a user for guiding forward, backward, and turning movement of the motorized dolly and at least one electronic control for engaging and disengaging the drive system.

According to another aspect of the disclosure, a method of moving at least one slab with any of the previously described motorized dollies includes a step of securing the at least one slab to the platform. The method also includes a step of, with the platform in the transport position, activating the drive system and moving the motorized dolly to an installation location, and a step of moving the platform from the transport position to the unloading position. The method also includes a step of extending the riser assembly, thereby lifting the platform and the at least one slab to an installation height, and a step of sliding the at least one slab from the platform to the installation location.

Non-limiting examples of the present invention will now be described in the following numbered clauses:

Clause 1: A motorized dolly for transporting at least one slab, the motorized dolly comprising: a base comprising a plurality of wheels rotatably connected to the base for moving the base along a ground surface; a drive system comprising at least one motor disposed in the base and coupled to at least one of the plurality of wheels configured to rotate the at least one wheel of the plurality of wheels for forward and backward movement of the base along the ground surface; a riser assembly connected to the base configured to extend to increase a height of the at least one slab relative to the base and the ground surface and to retract to reduce the height of the at least one slab relative to the ground surface and the base; a platform pivotally and rotatably connected to the riser assembly configured to receive the at least one slab, wherein the platform pivots relative to the riser assembly to transition the platform between a transport position, where the platform is in a substantially vertical position, and an unloading position, where the platform is in a substantially horizontal position; a plurality of outrigger supports comprising a first end connected to the base and a second end opposite the first end, the plurality of outrigger supports being configured to be deployed to contact the ground surface for stabilizing the base and the at least one slab received by the platform; and a turning leg rotatably connected to the base and extending downward from a bottom side of the base, the turning leg being transitionable from a retracted position in which the turning leg does not interfere with the forward and backward movement of the base, and an extended position in which the turning leg lifts the base and the plurality of wheels away from the ground surface.

Clause 2: The motorized dolly of clause 1, wherein when the turning leg is in the extended position, forward and backward movement of the base along the ground surface is prevented.

Clause 3: The motorized dolly of clause 1 or clause 2, further comprising at least one continuous tread track around at least two of the plurality of wheels, wherein rotation of the at least one wheel of the plurality of wheels moves the at least one continuous tread track causing the forward and backward movement of the base along the ground surface.

Clause 4: The motorized dolly of clause 3, wherein the motorized dolly comprises a first continuous tread track between a first set of the plurality of wheels and a second continuous tread track between a second set of the plurality of wheels.

Clause 5: The motorized dolly of clause 3 or clause 4, wherein the at least one continuous tread track comprises a wedge portion on a leading side of the at least one continuous tread track for moving the motorized dolly over uneven surfaces.

Clause 6: The motorized dolly of clause 5, wherein the wedge portion on the leading side of the at least one continuous tread track is shaped to move the motorized dolly up a flight of stairs.

Clause 7: The motorized dolly of any of clauses 1-6, wherein the base further comprises a track extending substantially parallel to a longitudinal axis of the base, and wherein the riser assembly is slidably connected to the track, such that the riser assembly, the platform, and the at least one slab received by the platform slide along the track in a direction substantially parallel with the longitudinal axis of the base.

Clause 8: The motorized dolly of clause 7, wherein sliding the riser assembly along the track repositions a center of gravity of the at least one slab relative to the base.

Clause 9: The motorized dolly of clause 7 or clause 8, wherein the track is mounted to and extends over a top surface of the base.

Clause 10: The motorized dolly of any of clauses 1-9, wherein the drive system further comprises a lifting motor coupled to the riser assembly for extending and/or retracting the riser assembly, thereby changing the height of the at least one slab relative to the base.

Clause 11: The motorized dolly of clause 10, wherein the drive system further comprises a motor coupled to the riser assembly and/or platform that causes the platform to pivot relative to the riser assembly, thereby moving the platform between the transport position and the unloading position.

Clause 12: The motorized dolly of any of clauses 1-11, wherein the platform comprises interconnected primary members extending in a first direction and secondary members extending in a second direction defining a carrying surface for contacting the at least one slab, which support the at least one slab when the platform is in the unloading position, and a removable lip support along a periphery of the platform for supporting the at least one slab when the platform is in the transport position.

Clause 13: The motorized dolly of any of clauses 1-12, wherein, when deployed, the plurality of outrigger supports stabilize the base preventing the base from tipping over under weight of the at least one slab.

Clause 14: The motorized dolly of any of clauses 1-13, wherein the plurality of outrigger supports are height adjustable configured to extend to lift the base from the ground surface increasing the height of the at least one slab relative to the ground surface.

Clause 15: The motorized dolly of any of clauses 1-14, wherein the second ends of the plurality of outrigger supports comprise threaded bolts configured to be rotated to lift the base from the ground surface increasing the height of the at least one slab relative to the ground surface.

Clause 16: The motorized dolly of any of clauses 1-15, wherein the first ends of the plurality of outrigger supports are rotatably connected to the base and configured to transition between a retracted position, in which the second ends of the plurality of outrigger supports contact the base, and a deployed position, in which the second ends of the plurality of outrigger supports are rotated away from the base.

Clause 17: The motorized dolly of clause 16, comprising four outrigger supports, with first ends of the outrigger supports rotatably connected to corners of the base.

Clause 18: The motorized dolly of clause 16 or clause 17, wherein the first ends of the plurality of outrigger supports comprise adjustable latches for locking the plurality of outrigger supports in the deployed position.

Clause 19: The motorized dolly of clause 18, wherein the latches are adjustable, so that an angle of the outrigger support relative to the base, in the deployed position, can be adjusted.

Clause 20: The motorized dolly of any of clauses 1-19, further comprising a handle assembly connected to the base, the handle assembly comprising a handle configured to be grasped by a user for guiding forward, backward, and turning movement of the motorized dolly and at least one electronic control for engaging and disengaging the drive system.

Clause 21: The motorized dolly of clause 20, wherein the at least one electronic control comprises an input device configured to allow the user to at least one of: control the movement of the motorized dolly, control the riser assembly to adjust the height of the at least one slab, or move the turning leg between the retracted position and the extended position.

Clause 22: The motorized dolly of clause 20 or clause 21, wherein the handle assembly further comprises: a horizontal sliding member slidably connected to the base configured to move into the base, thereby moving the handle towards the base, and out of the base, thereby moving the handle away from the base; and a vertical member connected between a first end of the horizontal sliding member and the handle.

Clause 23: The motorized dolly of clause 22, wherein a second end of the horizontal sliding member is received within the base.

Clause 24: The motorized dolly of clause 22 or clause 23, wherein the vertical member is rotatably connected to the first end of the sliding member, thereby allowing the vertical member and handle connected thereto to move between an end position, in which a longitudinal axis of the vertical member is transverse to a longitudinal axis of the horizontal sliding member, and a side position, in which the longitudinal axis of the vertical member is rotated away from the longitudinal axis of the horizontal sliding member.

Clause 25: The motorized dolly of clause 24, wherein, with the vertical member and handle in the side position, the horizontal sliding member can move into the base thereby moving the vertical member and handle towards the base without contacting the at least one slab received by the platform.

Clause 26: The motorized dolly of clause 24 or clause 25, wherein the vertical member is pivotally connected to the first end of the sliding member and configured to pivot about a connection point between the vertical member and the horizontal sliding member, thereby moving the vertical member from a vertical position to an angled position.

Clause 27: The motorized dolly of any of clauses 1-26, wherein, when the turning leg is deployed, the base is configured to rotate about the turning leg by an angular distance of 90 degrees or more.

Clause 28: The motorized dolly of any of clauses 1-27, wherein the riser assembly comprises a hub rotatably connected to the base comprising a first plate, a second plate, and a plurality of posts connected between the first plate and the second plate, wherein the platform is pivotally connected to the hub and comprises a latch configured to engage the first plate of the hub to lock the platform in the unloading position.

Clause 29: The motorized dolly of any of clauses 1-28, wherein the platform comprises a handle configured to be grasped by a user to move the platform between the transport position and the unloading position.

Clause 30: A motorized dolly for transporting at least one slab, the motorized dolly comprising: a base comprising a plurality of wheels rotatably connected to the base for moving the base along a ground surface; a drive system comprising at least one motor disposed in the base and coupled to at least one of the plurality of wheels configured to rotate the at least one wheel of the plurality of wheels for forward and backward movement of the base along the ground surface; a riser assembly connected to the base configured to extend to increase a height of the at least one slab relative to the base and the ground surface and to retract to reduce the height of the at least one slab relative to the ground surface and the base; a platform pivotally and rotatably connected to the riser assembly configured to receive the at least one slab, wherein the platform pivots relative to the riser assembly to transition the platform between a transport position, where the platform is in a substantially vertical position, and an unloading position, where the platform is in a substantially horizontal position; and a handle assembly connected to the base, the handle assembly comprising a handle configured to be grasped by a user for guiding forward, backward, and turning movement of the motorized dolly and at least one electronic control for engaging and disengaging the drive system.

Clause 31: The motorized dolly of clause 30, further comprising at least one continuous tread track around at least two of the plurality of wheels, wherein rotation of the at least one wheel of the plurality of wheels moves the at least one continuous tread track causing the forward and backward movement of the base along the ground surface.

Clause 32: The motorized dolly of clause 31, wherein the motorized dolly comprises a first continuous tread track between a first set of the plurality of wheels and a second continuous tread track between a second set of the plurality of wheels.

Clause 33: The motorized dolly clause 31 or clause 32, wherein the at least one continuous tread track comprises a wedge portion on a leading side of the at least one continuous tread track for moving the motorized dolly over uneven surfaces.

Clause 34: The motorized dolly of clause 33, wherein the wedge portion on the leading side of the at least one continuous tread track is shaped to move the motorized dolly up a flight of stairs.

Clause 35: The motorized dolly of any of clauses 30-34, wherein the base further comprises a track extending substantially parallel to a longitudinal axis of the base, and wherein the riser assembly is slidably connected to the track, such that the riser assembly, the platform, and the at least one slab received by the platform slide along the track in a direction substantially parallel with the longitudinal axis of the base.

Clause 36: The motorized dolly of clause 35, wherein sliding the riser assembly, the platform, and the at least one slab received by the platform along the track repositions a center of gravity of the at least one slab relative to the base.

Clause 37: The motorized dolly of clause 36, wherein the track is mounted to and extends over a top surface of the base.

Clause 38: The motorized dolly of any of clauses 30-37, wherein the drive system further comprises a lifting motor coupled to the riser assembly for extending and/or retracting the riser assembly, thereby changing the height of the at least one slab relative to the base.

Clause 39: The motorized dolly of any of clauses 30-38, wherein the at least one electronic control comprises an input device configured to allow the user to at least one of control the movement of the motorized dolly, control the riser assembly to adjust the height of the at least one slab, and move the turning leg between the retracted position and the extended position.

Clause 40: The motorized dolly of any of clauses 30-39, wherein the handle assembly further comprises: a horizontal sliding member slidably connected to the base configured to move into the base, thereby moving the handle towards the base, and out of the base, thereby moving the handle away from the base; and a vertical member connected between a first end of the horizontal sliding member and the handle.

Clause 41: The motorized dolly of clause 40, wherein a second end of the horizontal sliding member is received within the base.

Clause 42: The motorized dolly of clause 40 or clause 41, wherein the vertical member is rotatably connected to the first end of the sliding member, thereby allowing the vertical member and handle connected thereto to move between an end position, in which a longitudinal axis of the vertical member is transverse to a longitudinal axis of the horizontal sliding member, and a side position, in which the longitudinal axis of the vertical member is rotated away from the longitudinal axis of the horizontal sliding member.

Clause 43: The motorized dolly of clause 42, wherein, with the vertical member and handle in the side position, the horizontal sliding member can move into the base thereby moving the vertical member and handle towards the base without contacting the at least one slab received by the platform.

Clause 44: The motorized dolly of clause 43, wherein the vertical member is pivotally connected to the first end of the sliding member and configured to pivot about a connection point between the vertical member and the horizontal sliding member, thereby moving the vertical member from a vertical position to an angled position.

Clause 45: A method of moving at least one slab with the motorized dolly of any of clauses 1-44, the method comprising: securing the at least one slab to the platform; with the platform in the transport position, activating the drive system and moving the motorized dolly to an installation location; moving the platform from the transport position to the unloading position; extending the riser assembly, thereby lifting the platform and the at least one slab to an installation height; and sliding the at least one slab from the platform to the installation location.

Clause 46: The method of clause 45, further comprising deploying the plurality of outrigger supports to stabilize the base prior to extending the riser assembly to lift the platform and the at least one slab to the installation height.

Clause 47: The method of clause 45 or clause 46, wherein securing the at least one slab to the platform comprises, with the platform in the unloading position, positioning an edge of each of multiple slabs onto a lip of the platform, such that an outwardly facing surface of one stone slab is adjacent to an inwardly facing surface of another slab.

Clause 48: The method of clause 47, further comprising, with the platform in the unloading position, removing the removable lip from the platform, so that the multiple slabs can slide from the platform in any direction.

Clause 49: The method of clause 47 or clause 48, further comprising, after sliding a first slab from the platform to the installation location, increasing a height of the platform by a distance equal to a thickness of the stone slab and then sliding a second stone slab from the platform to a second installation location.

Clause 50: The method of clause 49, wherein increasing the height of the platform comprises at least one of increasing a height of the outrigger supports, thereby increasing a height of the base and platform relative to the ground surface, or engaging the riser assembly to increase a height of the platform relative to the base.

BRIEF DESCRIPTION OF THE DRAWINGS

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limit of the invention.

DETAILED DESCRIPTION

Figure 1A:
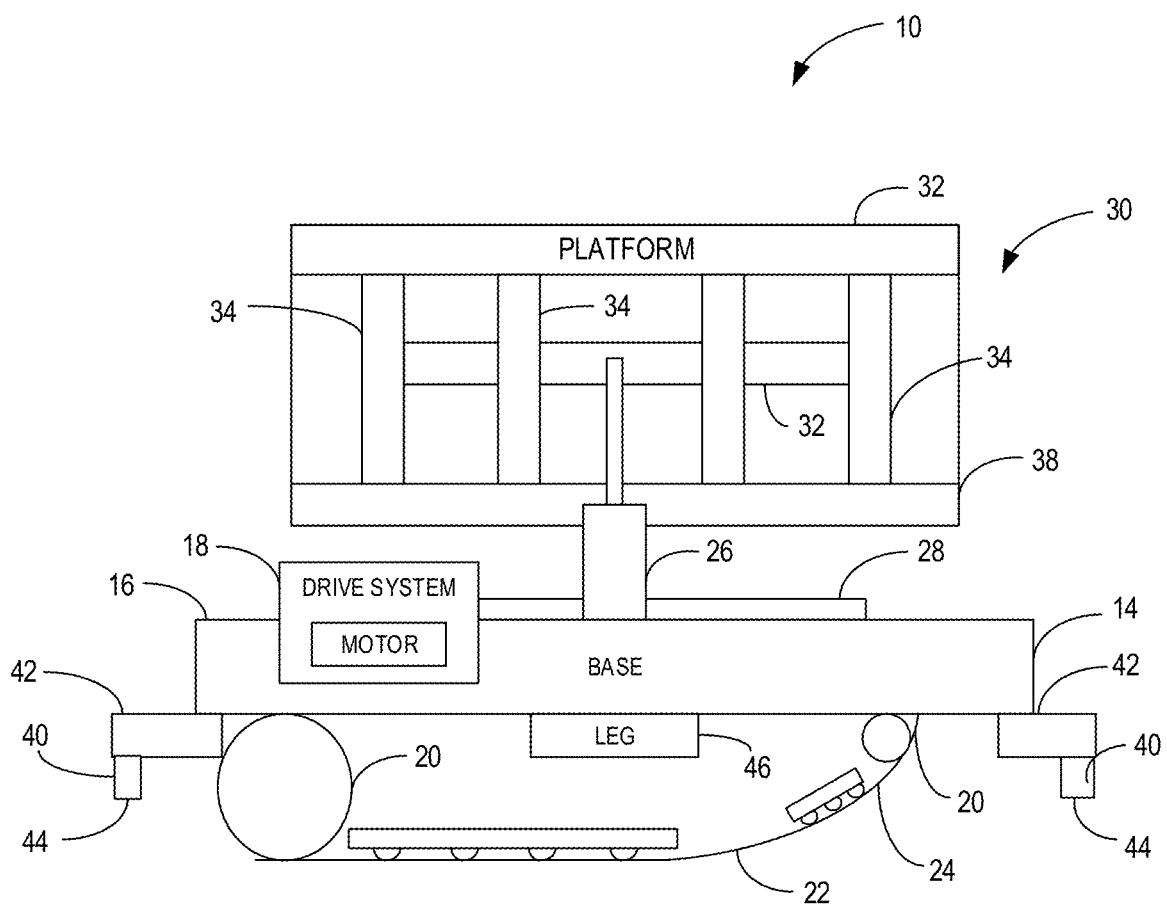
FIG. 1A is a schematic drawing of a motorized dolly, according to an aspect of the present disclosure.

As used herein, the singular form of "a", "an", and "the" include plural referents unless the context clearly dictates otherwise. For the purposes of this specification, unless otherwise indicated, all numbers expressing quantities of ingredients, reaction conditions, dimensions, physical characteristics, and so forth used in the specification and claims are to be understood as being modified in all instances by the term "about."

As used herein, the terms "right", "left", "top", and derivatives thereof shall relate to the invention as it is oriented in the drawing figures. However, it is to be understood that the invention can assume various alternative orientations and, accordingly, such terms are not to be considered as limiting. Also, it is to be understood that the invention can assume various alternative variations and stage sequences, except where expressly specified to the contrary. It is also to be understood that the specific devices and processes illustrated in the attached drawings, and described in the following specification, are examples. Hence, specific dimensions and other physical characteristics related to the embodiments disclosed herein are not to be considered as limiting.

Also, it should be understood that any numerical range recited herein is intended to include all sub-ranges subsumed therein. For example, a range of "1 to 10" is intended to include any and all sub-ranges between and including the recited minimum value of 1 and the recited maximum value of 10, that is, all sub-ranges beginning with a minimum value equal to or greater than 1 and ending with a maximum value equal to or less than 10, and all sub-ranges in-between, e.g., 1 to 6.3, or 5.5 to 10, or 2.7 to 6.1.

Figure 2A:
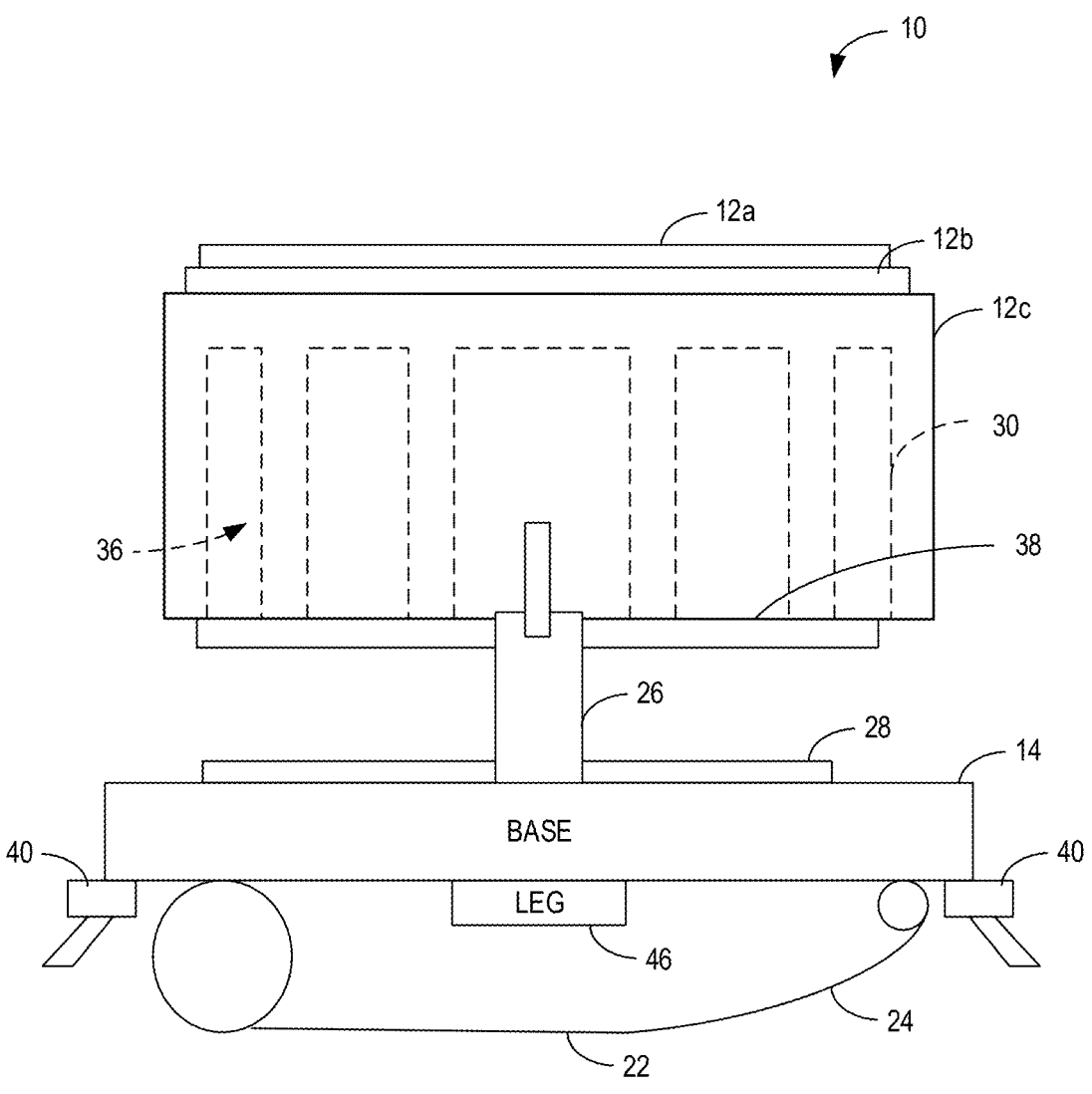
FIG. 2A is a schematic drawing of the motorized dolly of FIG. 1A with the platform in a transport position loaded with multiple slabs.
Figure 2B:
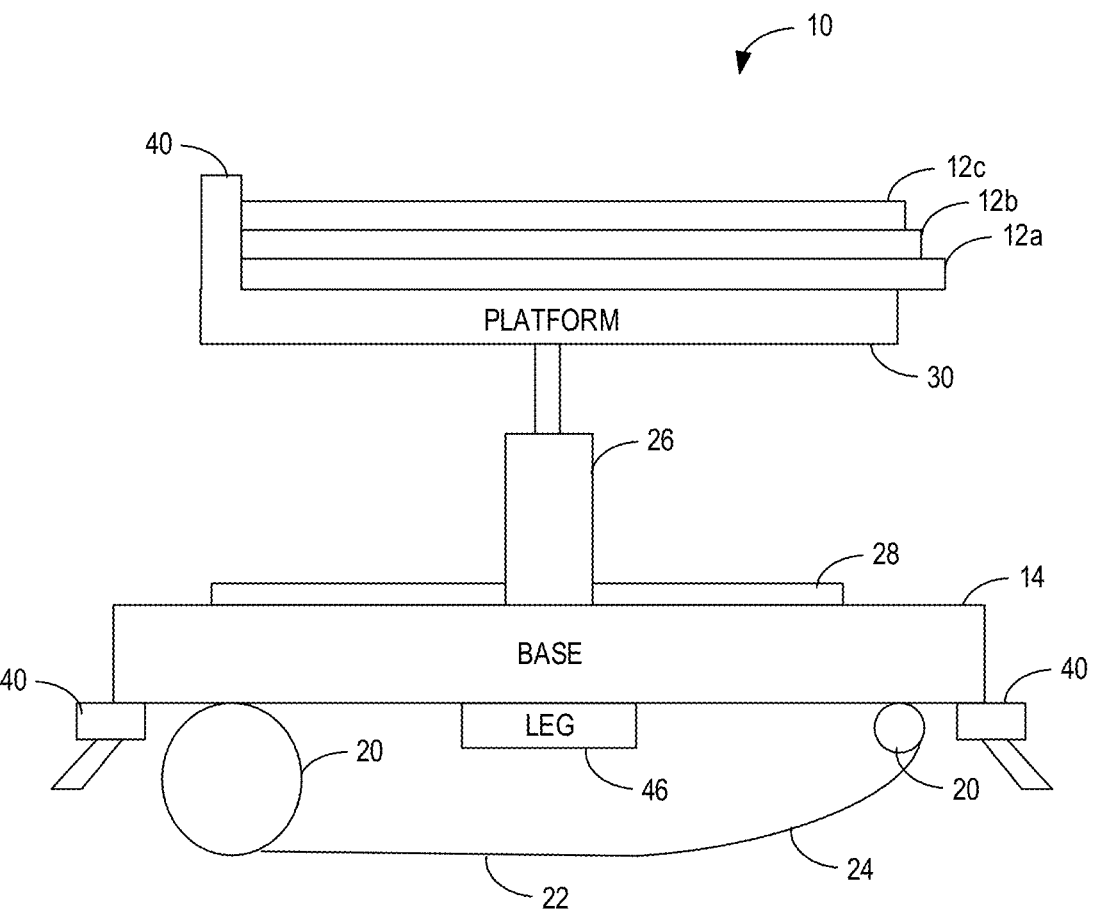
FIG. 2B is a schematic drawing of the loaded motorized dolly of FIG. 2A with the platform in an unloading position.

The present disclosure is directed to a motorized conveyance, such as a hand truck, cart, or dolly 10, 210 for moving heavy loads, such as natural or engineered stone slabs 12a, 12b, 12c (shown in FIGS. 2A and 2B). The motorized dolly 10, 210 desirably is small in size, so that it can be used for transporting loads through narrow hallways and doorways, which are often found in private houses, apartments, and condominiums. Also, the motorized dolly 10, 210 can be configured to move heavy loads up or down flights of stairs and around tight corners. In some examples, the motorized dolly 10, 210 can also be configured to lift the stone slabs 12a, 12b, 12c to a desired installation height so that the stone slabs 12a, 12b, 12c can slide directly from the motorized dolly 10, 210 to an installation location, such as over a top surface of a kitchen cabinet or bathroom vanity.

Figure 1B:
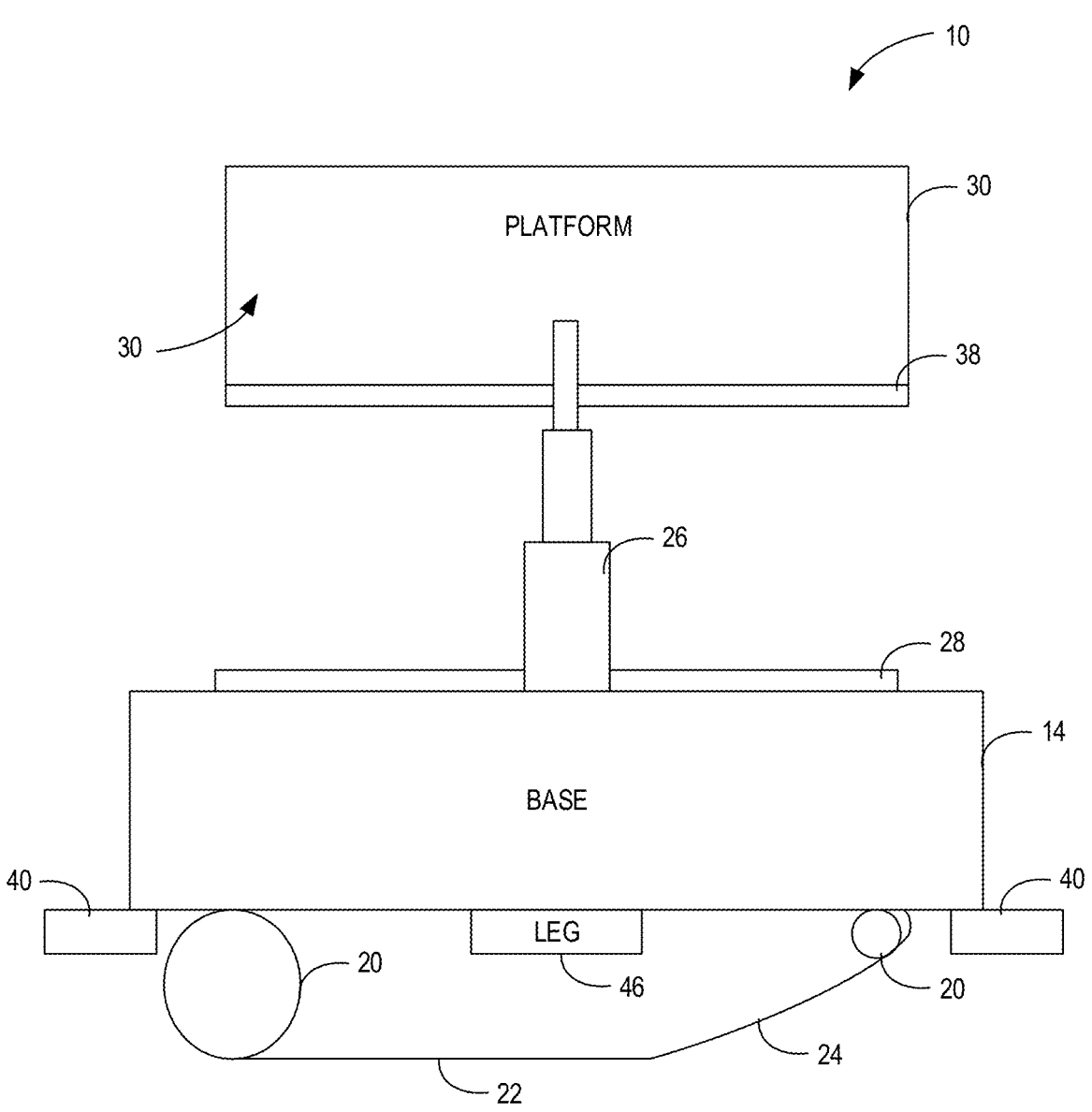
FIG. 1B is a schematic drawing of the motorized dolly of FIG. 1A with a riser support in an elevated position.
Figure 1C:
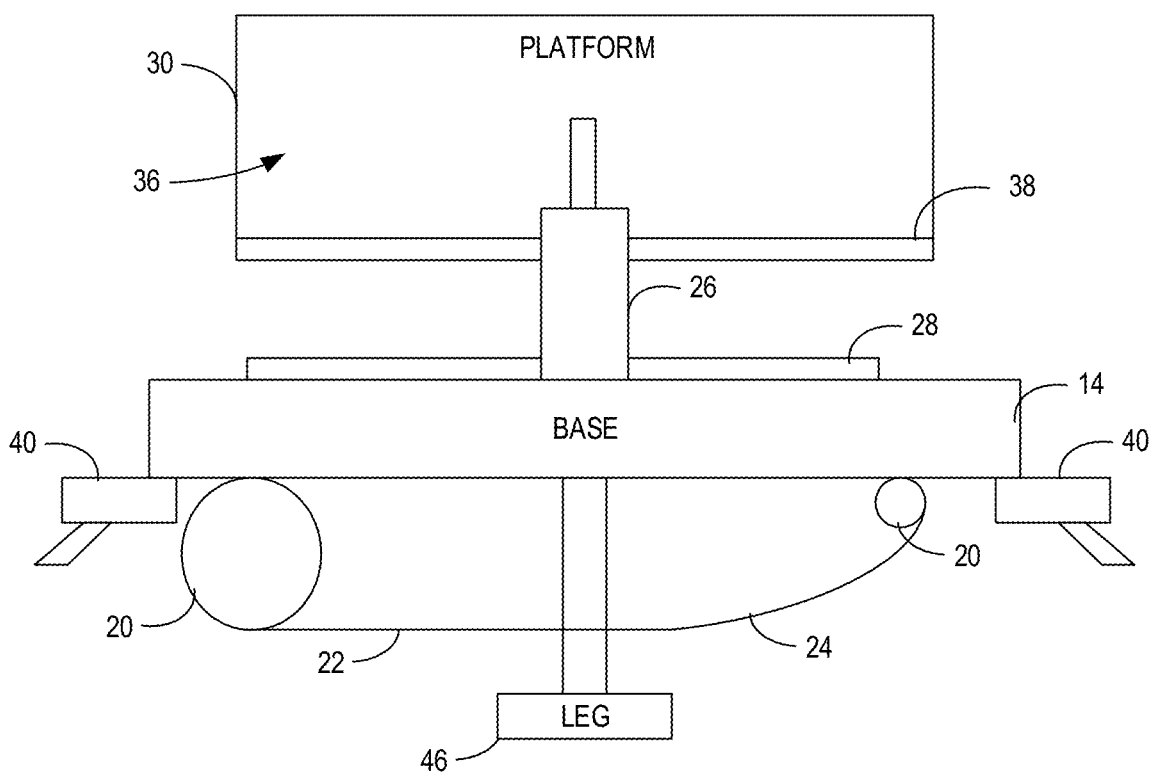
FIG. 1C is a schematic drawing of the motorized dolly of FIG. 1A with the turning leg in a deployed position.
Figure 1D:
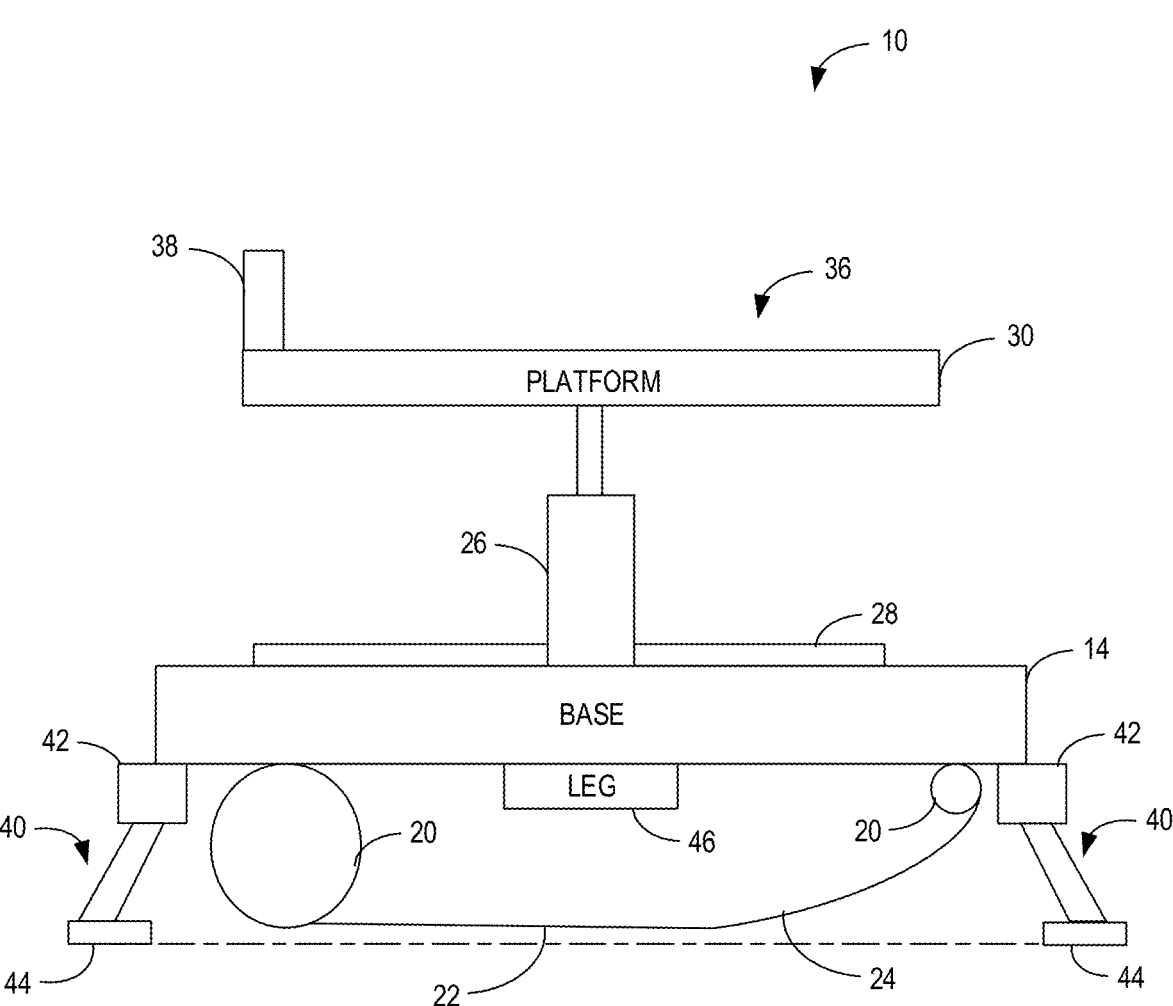
FIG. 1D is a schematic drawing of the motorized dolly of FIG. 1A with the platform in an unloading position and the outrigger supports deployed.
Figure 1E:
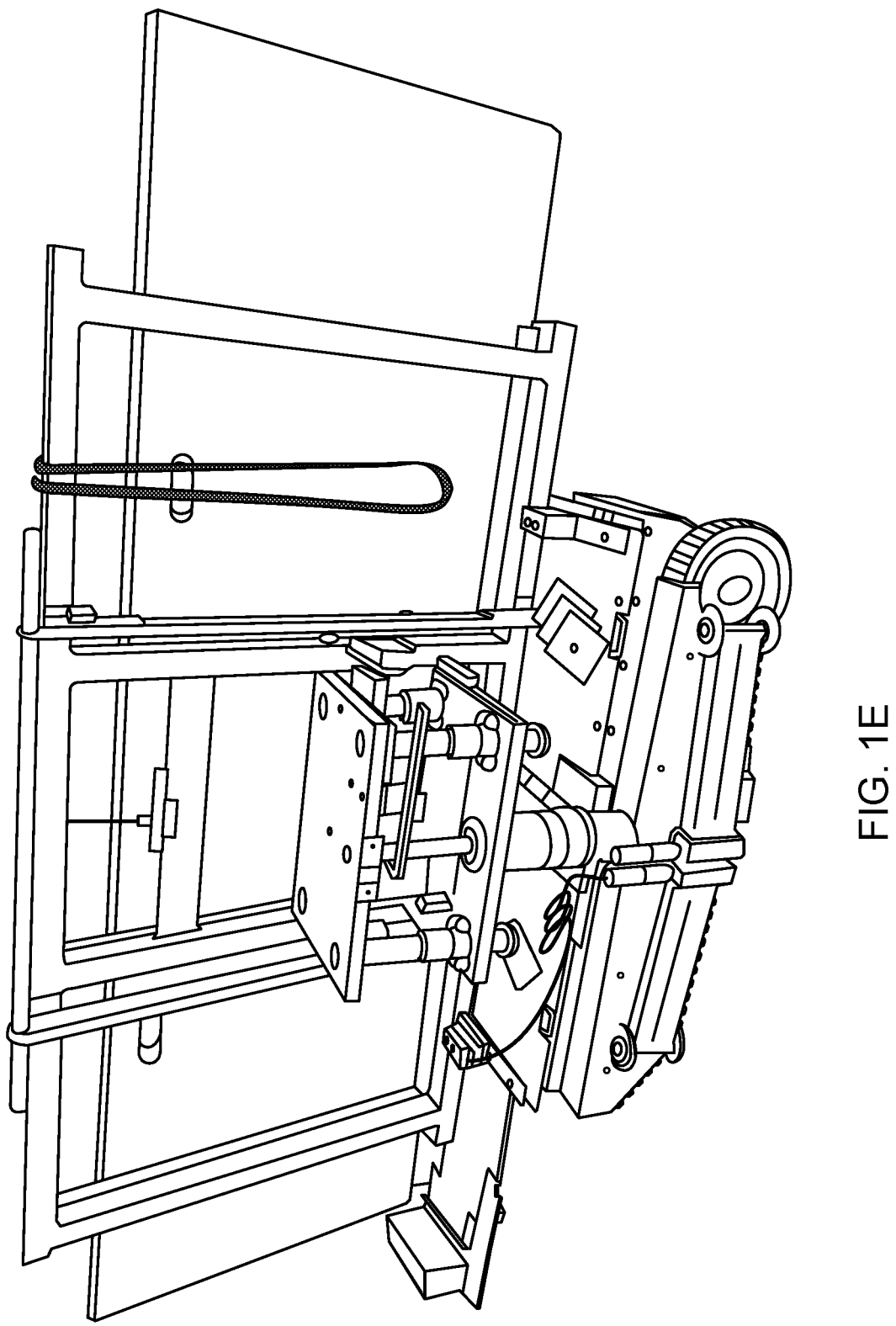
FIG. 1E is a drawing of an exemplary motorized dolly including features of the dolly of FIG. 1A, according to an aspect of the present disclosure.

FIGS. 1A-1D show an example of a motorized dolly 10 for transporting heavy loads, such as stone slabs. FIG. 1E is a drawing of another exemplary motorized dolly including features of the motorized dolly 10 disclosed herein. The motorized dolly 10 comprises a vehicle body or base 14, which can enclose electrical components of the motorized dolly 10 including a motor 16, drive system 18, control circuitry, and related electrometrical components of the motorized dolly 10. The base 14 also includes one or more wheels 20 rotatably connected to the base 14 for moving the base 14 along a ground surface. In some examples, one or more of the wheels 20 can be configured to pivot or turn relative to the base 14 for turning the motorized dolly 10 (e.g., for turning the motorized dolly 10 in a right direction or a left direction). In some examples, the wheels 20 may directly contact the ground surface for moving the motorized dolly 10 in the forward and backwards directions. In other examples, as shown in FIGS. 1A-1D, the motorized dolly 10 includes one or more continuous tread tracks 22 around two or more of the wheels 20. Rotation of the wheels 20 is transferred to the continuous tread tracks 22, such that rotation of the one or more wheels 20 causes the continuous tread track 22 to move along the ground surface causing the forward or backward movement of the motorized dolly 10. In some examples, the motorized dolly 10 includes both a right-side continuous tread track 22 and a left-side continuous tread track 22 for moving the motorized dolly 10 over the ground surface. Also, in some examples, the continuous tread track(s) 22 can include a wedge portion 24 on a leading side of the continuous tread track(s) 22 for moving the motorized dolly 10 over uneven surfaces, such as up a stair or over an obstacle.

Figure 3A:
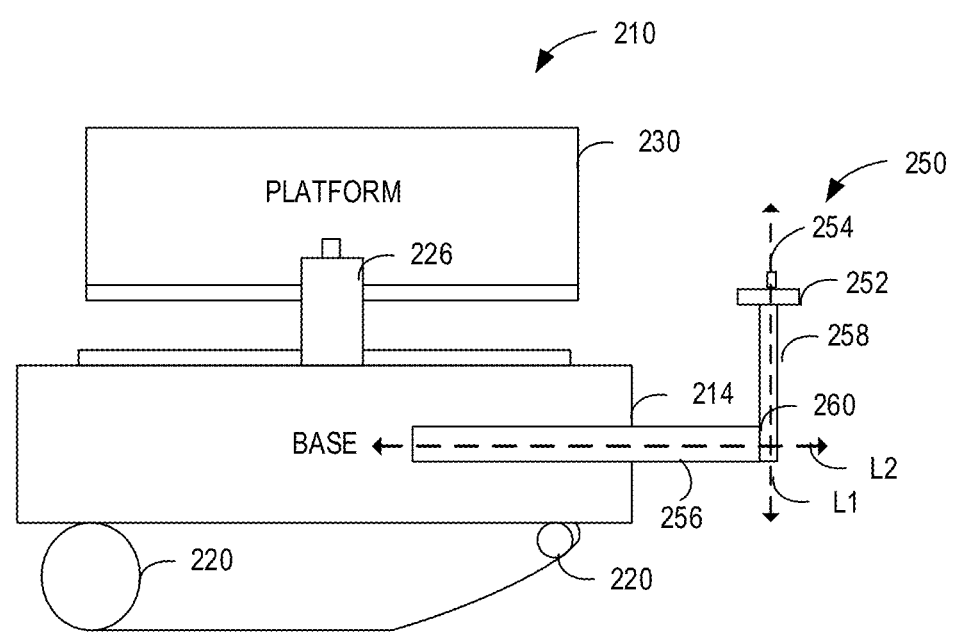
FIG. 3A is a schematic drawing of a motorized dolly including a handle assembly in a retracted position, according to an aspect of the present disclosure.
Figure 3B:
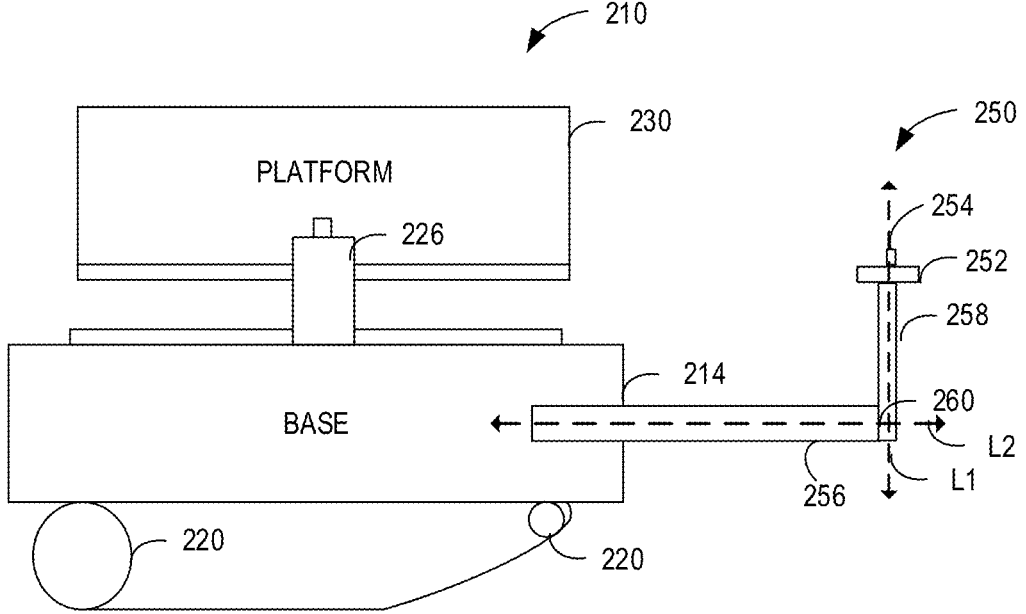
FIG. 3B is a schematic drawing of the motorized dolly of FIG. 3A, with the handle assembly in an extended position.
Figure 3C:
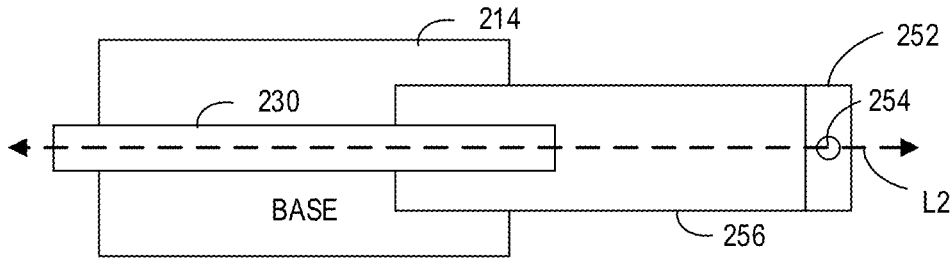
FIG. 3C is a schematic drawing of a top view of a motorized dolly showing a handle in an end position, according to an aspect of the present disclosure.
Figure 3D:
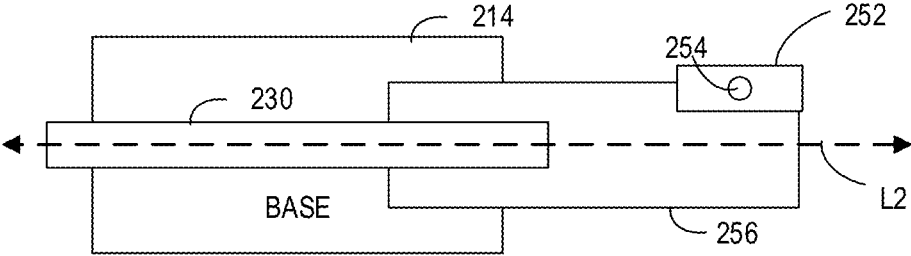
FIG. 3D is another schematic drawing of a top view of the motorized dolly of FIG. 3D showing the handle in a side position.
Figure 3E:
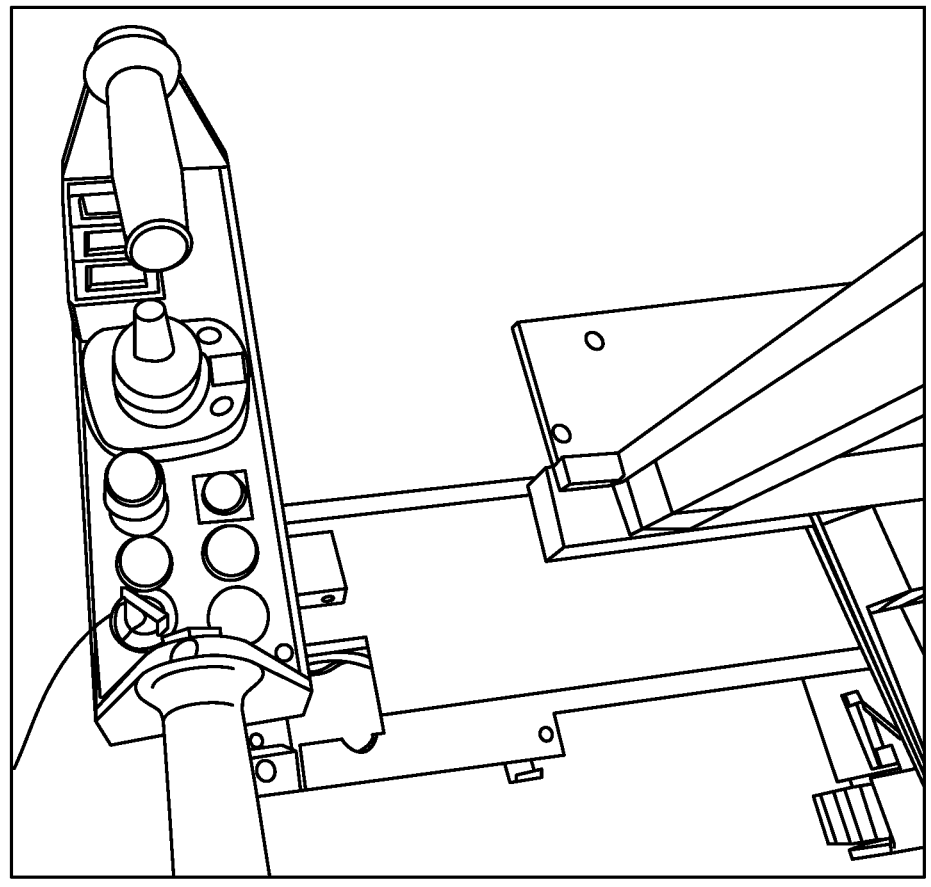
FIG. 3E is a drawing of a handle of a motorized dolly including input devices or controls, according to an aspect of the present disclosure.

The motorized dolly 10 also includes the drive system 18 comprising the motor 16, such as an electric or gasoline-powered motor, which can be disposed in the base 14 and coupled to one or more of the wheels 20. The motor 16 can be configured to rotate one or more of the wheel(s) 20 causing the forward and backward movement of the base 14 along the ground surface. As described in further detail herein, the drive system 18 can also include additional motors for adjusting a height of the heavy load secured to the motorized dolly 10 and/or for moving the heavy load between a transport position and an unloading position. The drive system 18 can also include user interface accessories, such as a joystick or another input component for manually controlling the motorized dolly 10, as well as control circuitry electrically coupled to the motor 16 for actuating the motor 16 in response to inputs entered by the user interface accessories. An example of a handle of a motorized dolly 10 including user interface accessories or input devices is shown in FIG. 3E.

The motorized dolly 10 further comprises a riser assembly or riser support 26, such as a telescoping member, linear actuator, and/or hydraulic cylinder, connected to the base 14.

The riser support 26 is configured to extend to increase a height of the heavy load, such as the stone slab, relative to the base 14 and the ground surface and to retract to reduce the height of the heavy load relative to the ground surface and the base 14. The riser support 26 is shown in a retracted or lowered position in FIGS. 1A and 1n an elevated or extended position in FIG. 1B. In some examples, in order to adjust the elevation of the heavy load, the drive system 18 can include a lifting motor coupled to the riser support 26 for extending and/or retracting the riser support 26, thereby changing a height of the heavy load relative to the base 14. In other examples, the riser support 26 can be raised and lowered manually by the installer.

Figure 1F:
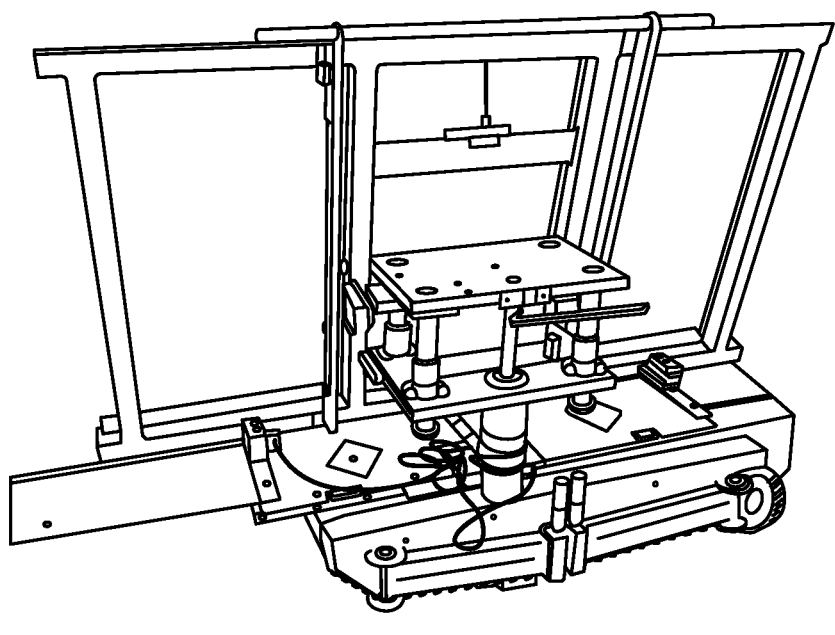
FIG. 1F is a drawing of the motorized dolly of FIG. 1E showing the platform positioned over a front of the dolly, according to an aspect of the present disclosure.
Figure 1G:
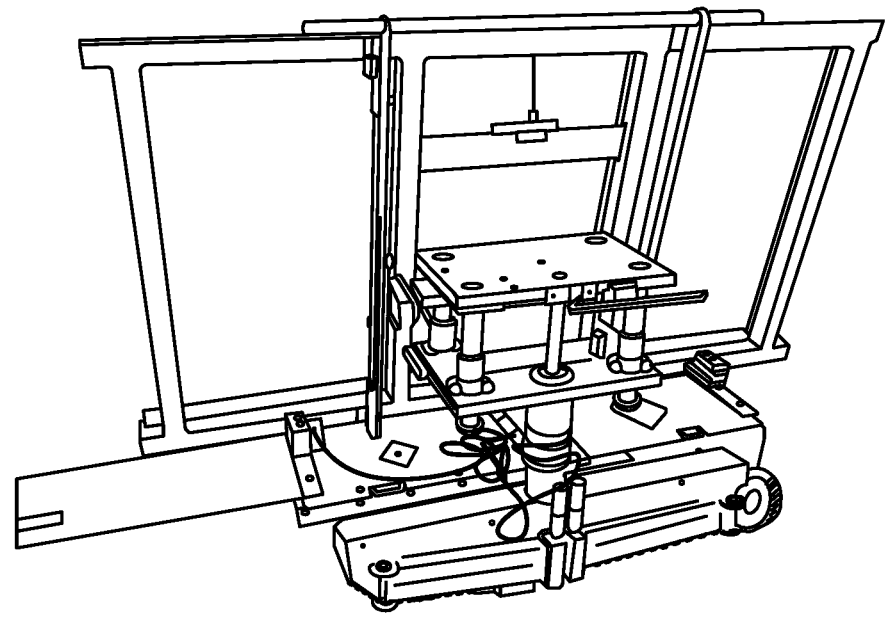
FIG. 1G is a drawing of the motorized dolly of FIG. 1E showing the platform positioned over a center of the dolly, according to an aspect of the present disclosure.

In some examples, the riser support 26 is configured to slide along the base 14, which adjusts or changes a center of gravity of the heavy load, such as the stone slab, relative to the base 14. For example, the base 14 can include a track 28, such as a longitudinally extending member or slot, extending substantially parallel to a longitudinal axis of the base 14. The track 28 can be mounted to and can extend over a top surface of the base 14. The riser support 26 can be slidably connected to the track 28, such that the riser support 26 and heavy load connected thereto slide along the track 28 in a direction substantially parallel with the longitudinal axis of the base 14, thereby moving the heavy load relative to the base 14. FIG. 1F shows an example of a motorized dolly 10 with the riser support 26 in a forward position, over a front end of the base 14. FIG. 1G shows a motorized dolly 10 with the riser support 26 over a center of the case 14.

Sliding the heavy load along the track 28 and relative to the base 14 in order to adjust the center of gravity of the heavy load relative to the base 14 can be especially helpful when using the motorized dolly 10 to move a heavy load, such as the stone slab, up or down an angled surface, such as a flight of stairs. For example, a user may slide the heavy load backwards along the track 28 (e.g., towards and/or beyond a back end of the base 14) reducing force on the front end of the base 14 so that the base 14 can begin to move onto an angled surface, such as beginning to move up a flight of stairs. Once the entire base 14 is on the angled surface or stairs, the user can move the heavy load frontwards (e.g., towards a middle or front end of the base 14), reducing weight on the back of the base 14 so that the base 14 does not fall backwards or tip over. As the motorized dolly 10 approaches a top of the angled surface or stairs, the user can move the heavy load to a forward-most position relative to the base 14, causing the base 14 to transition from an angled orientation towards a horizontal orientation at the top of the angled surface or flight of stairs.

With continued reference to FIGS. 1A-1D, the motorized dolly 10 further comprises a platform 30 pivotally and rotatably connected to the riser support 26. The platform 30 can be about 72 inches in length, which can be sufficient to support stone slabs having a major dimension of about 5 feet to about 10 feet in length. The platform 30 can include interconnected longitudinal or primary members 32 extending in a first direction and latitudinal or secondary members 34 extending in a second direction defining a carrying surface of the platform 30 for contacting the heavy load. The primary members 32 and secondary members 34 support the heavy load when the platform 30 is in the unloading position (shown in FIG. 1D). In some instances, the heavy load, such as the stone slabs, can be secured and held in contact to the carrying surface of the platform 30 by suitable connectors, such as straps, cables, brackets, ropes, ties, and similar connectors. The platform 30 also includes a shelf or lip 38 along a periphery of the platform 30 for supporting the heavy load when the platform 30 is in the transport position (shown in FIGS. 1A-1C). In some examples, the shelf or lip 38 is about 6 inches wide, configured to support four 1.5 inch thick stone slabs 12a, 12b, 12c, and about 72 inches in length. The shelf or lip 38 can be removable from the platform 30 so that when the platform 30 is in the horizontal or unloading position, the stone slabs 12a, 12b, 12c can slide off of the platform 30 over any side of the platform 30 and in any direction.

Figure 1H:
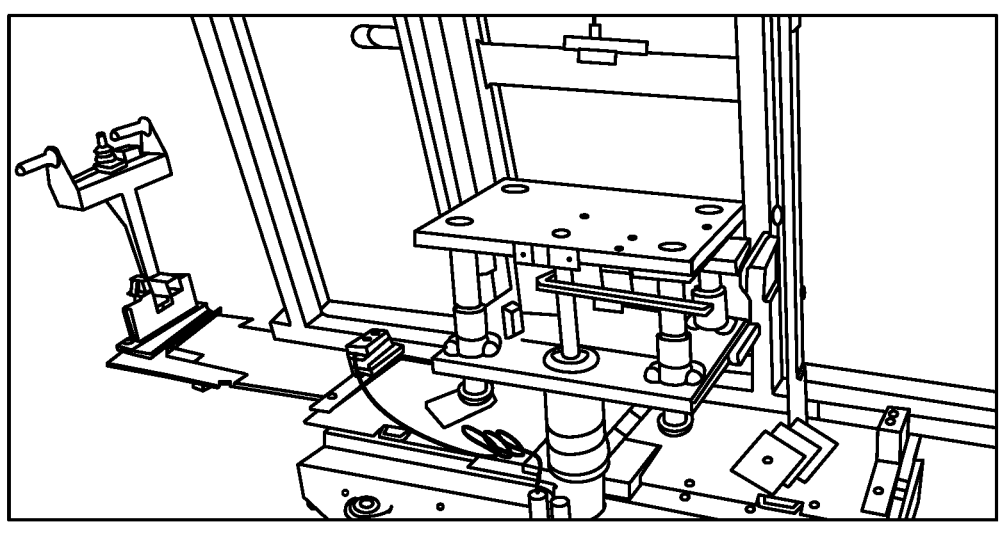
FIG. 1H is a drawing showing the platform of a motorized dolly in a vertical position, according to aspects of the present disclosure.
Figure 1I:
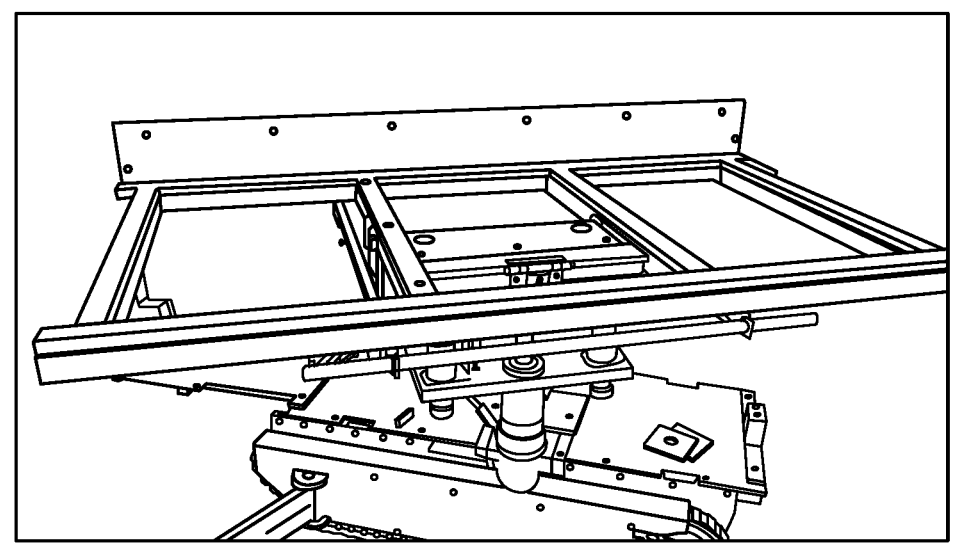
FIG. 1I is a drawing of the motorized dolly of FIG. 1H with the platform in a horizontal unloading position, according to an aspect of the present disclosure.
Figure 1J:
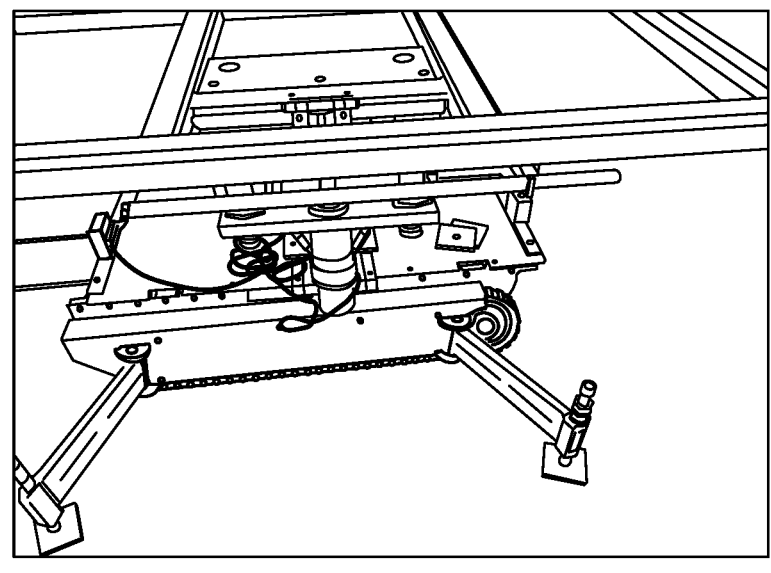
FIG. 1J is a drawing of the platform of the motorized dolly of FIG. 1H including a handle for manually moving the platform, according to an aspect of the present disclosure.

The platform 30 is configured to pivot relative to the riser support 26 to transition the platform 30 between the transport position, where the platform 30 is in a substantially vertical position (shown in FIG. 1A-1C), and the unloading position (shown in FIG. 1D), where the platform 30 is in a substantially horizontal position. FIGS. 1H and 1I are drawings showing another example of a platform 30 of a motorized dolly 10 including the members 32, 34 and lip 38. The platform 30 is in a substantially vertical position in FIGS. 1H and 1n a substantially horizontal position in FIG. 1I. In some examples, a user can manually move the platform 30 between the substantially vertical transport position and the horizontal unloading position by, for example, grasping the platform 30 and rotating it to a desired position. As shown in FIG. 1J, in some examples, the platform 30 can include a handle, such as an elongated member or rod, that allows the user to grasp and move the platform 30 in order, for example, to move the platform between the transport position and the unloading position.

In other examples, in order to adjust the position of the heavy load, the drive system 18 can include a motor 16 coupled to the riser support 26 and/or platform 30 that causes the platform 30 to pivot relative to the riser support 26 to move the platform 30 between the transport position and the unloading position. The platform 30 can also be configured to rotate relative to the riser support 26 by any desired angular distance, such as an angular distance of about 180 or about 360 degrees. For example, with the platform 30 in the horizontal or unloading position, the installer may rotate the platform 30 so that the stone slab 12a, 12b, 12c can slide off of the platform 30 to the installation location at a desired orientation.

Figure 1L:
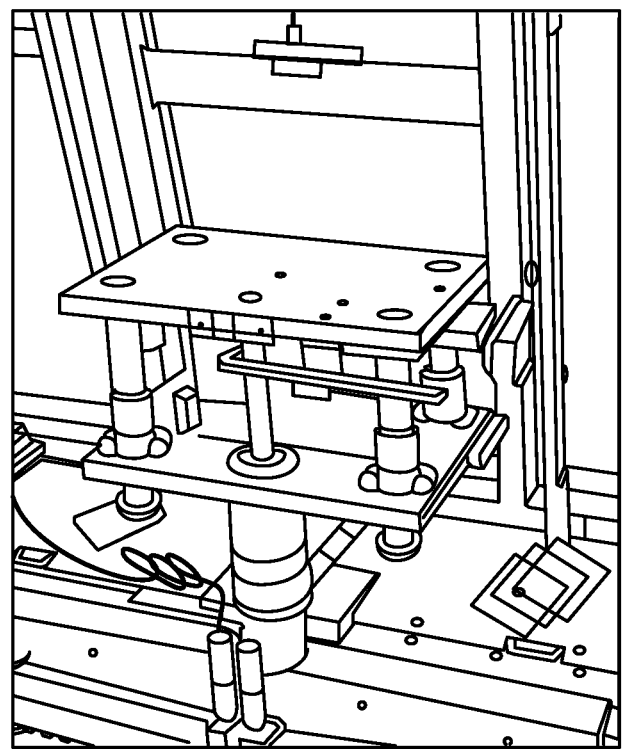
FIG. 1L is a drawing of the hub and riser support of FIG. 1K, according to an aspect of the present disclosure.
Figure 1K:
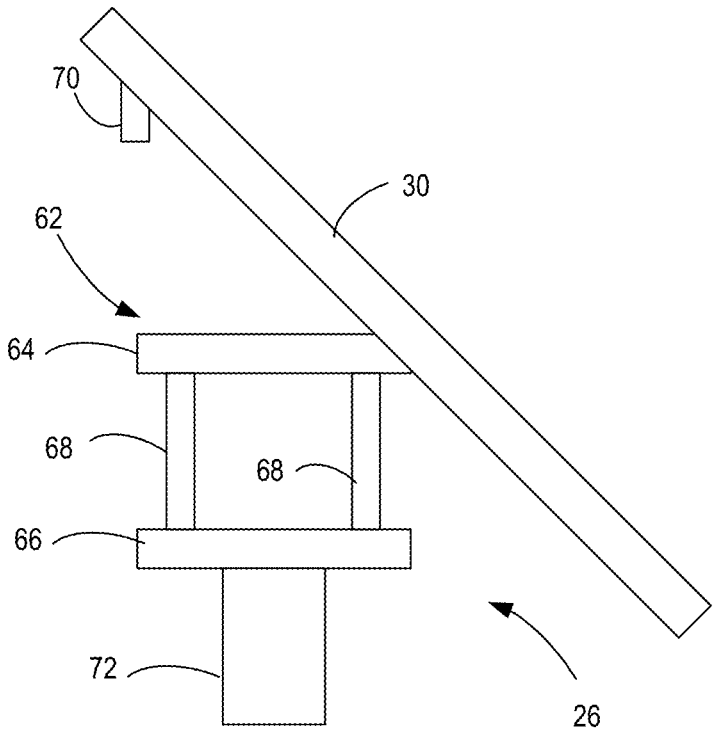
FIG. 1K is a schematic drawing of a hub of a riser support of a motorized dolly, according to an aspect of the present disclosure.

In some examples, the riser assembly or riser support 26 of the motorized dolly 10 comprises a hub assembly or hub 62, as shown in FIGS. 1K and 1L, for supporting the platform 30. The hub 62 can be rotatably connected to the base 14 and configured to move vertically to adjust the height of the at least one slab. For example, the riser support 26 can comprise a hydraulic cylinder 72 or similar linear actuator for vertical movement of the hub 62. In some examples, the hub 62 comprises a first or top plate 64, a second or bottom plate 66, and posts 68 connected between the top plate 64 and the bottom plate 66. The platform 30 can be pivotally connected to the hub 62, such as to the top plate 64. The platform 30 can be configured to pivot about the top plate 64 in order to transition the platform 30 between the vertical transport position and the horizontal unloading position. In some examples, the hub 62 and/or platform 30 can comprise a latch 70 configured to connect the hub 62 to the platform 30 to secure the platform 30 in the horizontal unloading position. For example, the latch 70 can be positioned on the platform 30 and configured to engage the top plate 64 of the hub 62 to lock the platform 30 in the horizontal unloading position.

The motorized dolly 10 further comprises deployable outrigger supports 40 for stabilizing the base 14 and the heavy load mounted thereto and, in particular, for preventing the base from tipping over as the heavy load, such as the stone slabs 12*a*, 12*b*, 12*c*, are loaded onto or unloaded from the platform 30. For example, the motorized dolly 10 can comprise four outrigger supports 40 extending from four corners of the base 14. The outrigger supports 40 can include a first or proximal end 42 connected to the base 14 and a free second or distal end 44 extending from the base 14 configured to contact the ground surface. FIGS. 2D-2F are drawings showing features of outrigger supports in both a retracted position (FIG. 2D) and an extended or deployed position (FIGS. 2E and 2F).

In some examples, the outrigger supports 40 are configured to be in a retracted position during transport. The outrigger supports 40 are deployed (shown in FIG. 1D) while unloading the heavy load, such as the stone slabs 12*a*, 12*b*, 12*c*, from the platform 30 of the motorized dolly 10. For example, the outrigger supports 40 can be configured to transition between a retracted position, in which the second or distal ends 44 of the outrigger supports 40 contacts the base 14, and a deployed position, in which the second or distal ends 44 of the outrigger supports 40 are rotated away from the base 14. In some examples, the first or proximal ends 42 of the outrigger supports 40 can include the adjustable latches (shown in FIGS. 2D-2F) for locking the outrigger supports 40 in the deployed position. For example, the latches can comprise holes at different angular positions. A user can insert a pin, post, or another elongated member through one of the holes to lock a particular outrigger support 40 in a selected angular location.

In some examples, the free distal end 44 of the outrigger supports 40 can include feet or pads for preventing the outrigger supports 40 from sliding on the ground surface. Furthermore, in some examples, the outrigger supports 40 are elevation adjustable configured to extend thereby lifting the base 14 from the ground surface and increasing a height of the heavy load relative to the ground surface. For example, an elevation of the outrigger supports 40 can be adjusted to move the motorized dolly 10 to an installation height so that the heavy load, such as the stone slabs 12*a*, 12*b*, 12*c*, can slide from the platform 30 to the installation location. In particular, as previously described, the stone slabs 12*a*, 12*b*, 12*c* can slide directly from the platform 30 to the installation location, such as to a top of an installed cabinet or bathroom vanity. In some examples, multiple countertop pieces or stone slabs 12*a*, 12*b*, 12*c* can be stacked on the platform 30. In such instances, the elevation adjustable outrigger supports 40 can be used to increase the elevation of the motorized dolly 10 by a small amount after each stone slab 12*a*, 12*b*, 12*c* is unloaded so that the motorized dolly 10 continues to line up with the installation location (i.e., the top of the cabinet or other installation site).

In some examples, the elevation adjustable outrigger supports 40 can comprise rotatable or threaded bolts. For example, the free second end or distal end 44 of the outrigger supports 40 can comprise a bolt (shown in FIGS. 2D-2F) that rotates relative to the second or distal end 44 in order to adjust an elevation of the outrigger supports and base 14. An elevation of each of the outrigger supports 44 can be independently adjusted by rotating the bolts in order to ensure that the base 14 is level when the heavy loads are being loaded onto or removed from the platform 30.

In some examples, the motorized dolly 10 further comprises a turning leg 46 rotatably connected to the base 14 and extending downward from a bottom side of the base 14. FIG. 2G is a drawing of an example of a motorized dolly with a turning leg in a deployed position. As shown in FIGS. 1A-1C, the turning leg 46 is configured to extend from the base 14 providing a rotation point for the motorized dolly 10 and the heavy load mounted thereto. More specifically, the turning leg 46 is configured to transition from a retracted position (shown in FIGS. 1A, 1B, and 1D), in which the turning leg 46 does not interfere with the forward and backward movement of the base 14, to a deployed position, in which the turning leg 46 lifts the base 14 and the wheels 20 away from the ground surface preventing the forward and backward movement of the base 14 along the ground surface. The turning leg 46 allows the motorized dolly 10 to make turns (e.g., turns of 90 degrees or more) in a small or narrow area, such as a stairwell landing or hallway. Specifically, with the motorized dolly 10 on the landing, the installer can cause the drive system 18 to move the turning leg 46 to the deployed position, which lifts the wheels 20 off of the ground surface. The drive system 18 can then cause the base 14 to rotate about the turning leg 46, thereby turning the base 14 by any desired amount, such as by any angular distance of 90 degrees, 180 degrees, or more. Once the base 14 is turned by the desired amount, the drive system 18 can return the turning leg 46 to the retracted position, thereby placing the wheels 20 or the continuous tread track 22 on the ground surface so that the drive system 18 can move the base 14 in the forward or backward direction, allowing the motorized dolly 10 to continue moving up or down the stairwell.

FIGS. 3A-3G show another example of a motorized dolly 210 for transporting a heavy object or load, such as one or more stone slabs, including features for controlling forward, backward, and turning movement of the dolly 210. In some examples, any or all of these features shown in FIGS. 3A-3G can also be included in the motorized dolly 10 shown in FIGS. 1A-2C. In other examples, these features can be included in a different example of a motorized vehicle, such as the motorized dolly 210 shown in FIGS. 3A-3G.

As shown in FIGS. 3A-3D, as in previous examples, the motorized dolly 210 comprises a base 214 with one or more wheels 220 rotatably connected to the base 214 for moving the base 214 along a ground surface. The motorized dolly 210 can further comprise a drive system, such as the drive system 18 shown in FIG. 1A, comprising a motor 16 disposed in the base 214 and coupled to at least one of the wheels 220. The drive system 18 and/or motor 16 can be configured to rotate the wheels 220 for forward and backward movement of the base 214 along the ground surface. The motorized dolly 210 can further comprise a riser assembly 226 connected to the base 214 configured to extend to increase a height of the heavy load, such as the slab, relative to the base 214 and the ground surface and to retract to reduce the height of the heavy load, such as the slab, relative to the ground surface and the base 214. The motorized dolly 210 can further comprise a platform 230 pivotally and rotatably connected to the riser assembly 226 configured to receive the heavy load. The platform 230 can be configured to pivot relative to the riser assembly 226 to transition the platform 230 between a transport position, where the platform 230 is in a substantially vertical position, and an unloading position, where the platform 230 is in a substantially horizontal position.

Unlike in previous examples, the motorized dolly 210 can further comprise a handle assembly 250 connected to the base 214. In some examples, the handle assembly 250 comprises a handle 252 configured to be grasped by a user for guiding forward, backward, and turning movement of the motorized dolly 210 and an electronic control for engaging and disengaging the drive system 18. For example, the electronic control can comprise an electronic input device 254, such as a button, track ball, joystick, touch screen display, or similar device configured to allow the user to, for example, control movement of the motorized dolly 210, adjust a height of the riser assembly 226, or move a turning leg extending from the base 214, if present, between a retracted position and an extended position. As previously described, an exemplary handle including user input devices, such as buttons and a joystick, is shown in FIG. 3E.

As shown in FIGS. 3A-3D, in some examples, the handle assembly 250 further comprises a horizontal sliding member 256 slidably connected to and/or partially received within the base 214. For example, the horizontal sliding member 256 can be configured to move into the base 214, thereby moving the handle 252 towards the base 214. The horizontal sliding member 256 is also configured to slide out of the base 214, thereby moving the handle 252 away from the base 214. The handle assembly 250 can further comprise a vertical member 258 connected between a distal or first end 260 of the horizontal sliding member 256 and the handle 252.

In some examples, the vertical member 258 can be rotatably connected to the first end 260 of the horizontal sliding member 256, which allows the vertical member 258 and handle 252 connected thereto to move between an end position (shown in FIGS. 3A-3C), in which a longitudinal axis L1 (shown in FIGS. 3A and 3B) of the vertical member 258 is transverse to a longitudinal axis L2 (shown in FIGS. 3A-3D) of the horizontal sliding member 256, and a side position (shown in FIG. 3D), in which the longitudinal axis L1 of the vertical member 258 is rotated or positioned away from the longitudinal axis L2 of the horizontal sliding member 256. With the vertical member 258 and handle 252 in the side position, the horizontal sliding member 256 can retract or move into the base 214, thereby moving the vertical member 258 and handle 252 towards the base 214, even when the heavy load, such as a slab, is positioned on the platform 230. In some instances, it may also be easier to control the motorized dolly 210 with the vertical member 258 and handle 252 in the side position if, for example, the user is trying to turn the motorized dolly 210 or move the motorized dolly 210 around corners or through other confined areas.

Figure 3F:
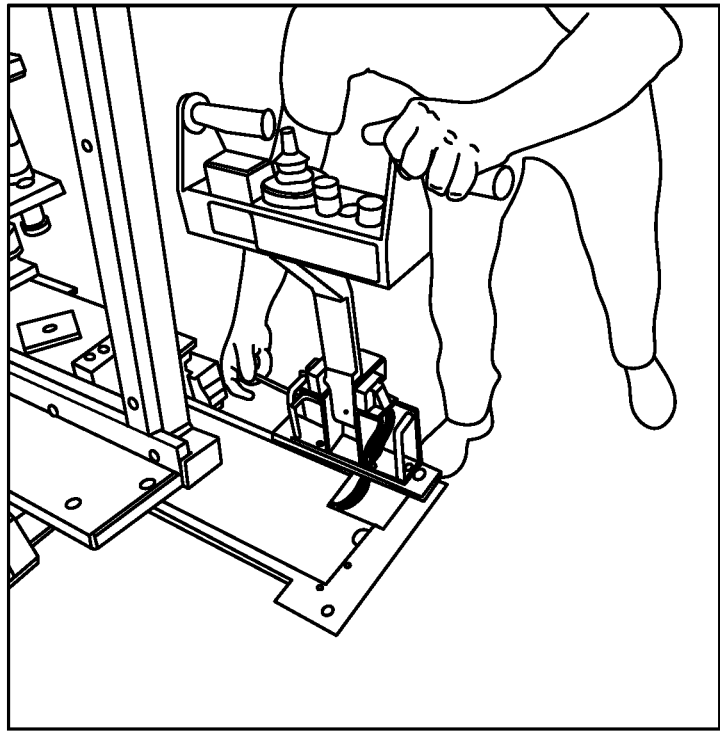
FIG. 3F is a drawing of a motorized dolly showing a vertical member and handle of a handle assembly in a vertical position, according to an aspect of the present disclosure.
Figure 3G:
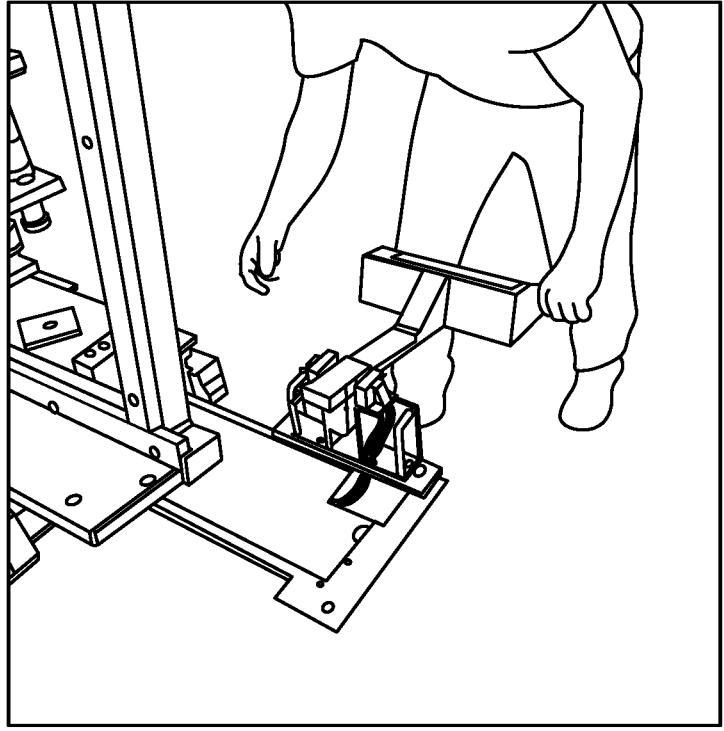
FIG. 3G is a drawing of a motorized dolly showing a vertical member and handle of a handle assembly in an angled or horizontal position, according to an aspect of the present disclosure.

In some examples, as shown in FIGS. 3F and 3G, the vertical member 258 can also be pivotally connected to the first end 260 of the horizontal sliding member 256. In particular, the vertical member 258 can be configured to pivot about a connection point between the vertical member 258 and the horizontal sliding member 256, thereby moving the vertical member 258 from the vertical position (shown in FIG. 3F) to a substantially horizontal or angled position (shown in FIG. 3G). Moving the vertical member 258 to the substantially horizontal or angled position and away from the platform 230 and the heavy load received by the platform 230 can allow a user to easily adjust a position of the platform 230 and/or heavy load received by the platform 230 as occurs, for example, when the user prepares to load or unload the heavy load from the platform 230.

Figure 4:
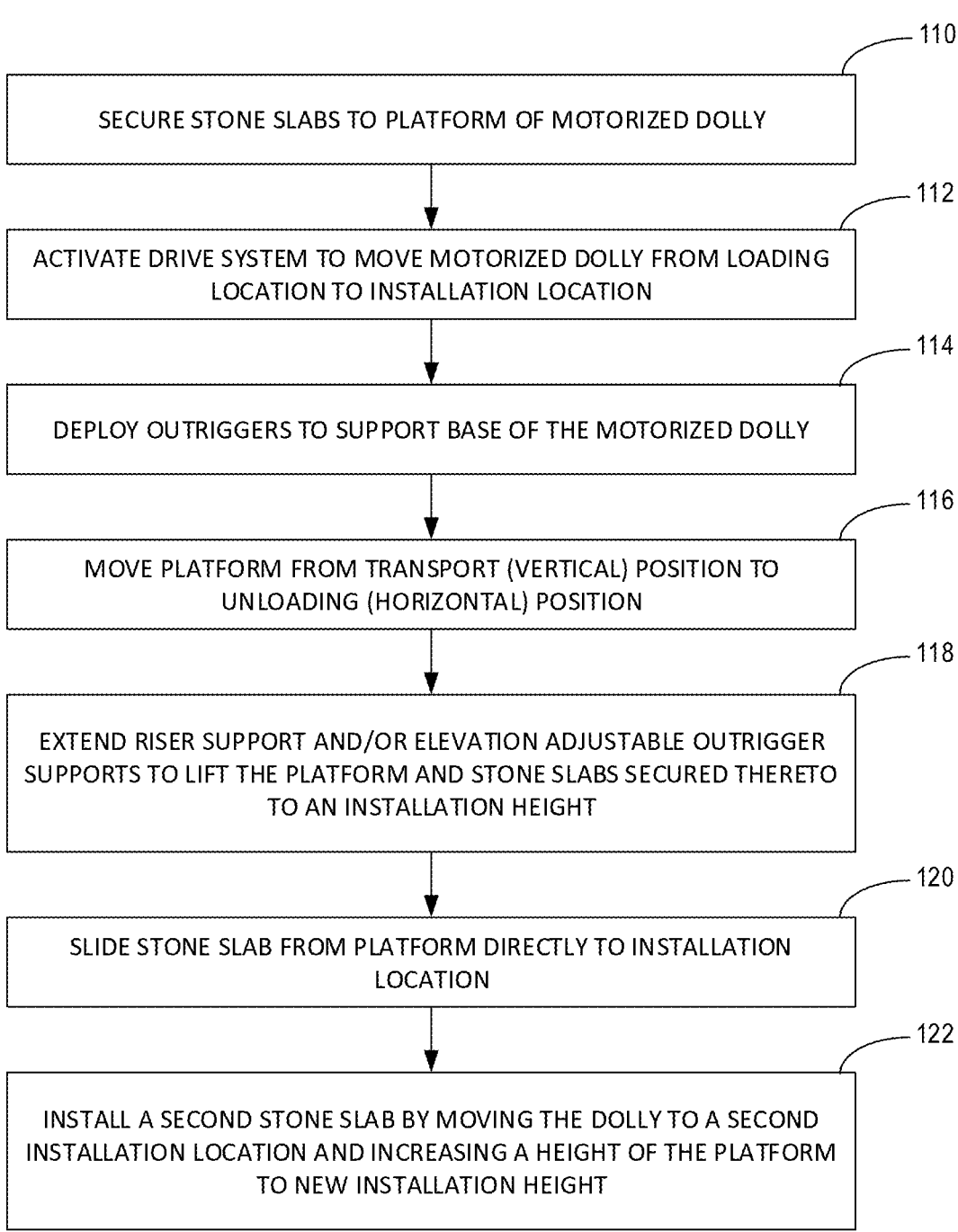
FIG. 4 is a flowchart showing steps for transporting a slab with a motorized dolly, according to an aspect of the present disclosure.

As previously described, the motorized dollies 10, 210 of the present disclosure can be used for delivering construction materials, such as natural or engineered stone slabs 12a, 12b, 12c, to an indoor installation location, such as a commercial business or private residence. FIG. 4 is a flowchart showing a method for moving the stone slabs 12a, 12b, 12c using one or more of the motorized dollies 10, 210, as previously described.

As shown in step 110, the method first includes securing one or multiple stone slabs 12a, 12b, 12c such as multiple countertop pieces, to the platform 30 of the motorized dolly 10. The motorized dolly 10 is loaded with the platform 30 in the vertical or transport position by lowering the stone slabs 12a, 12b, 12c onto the shelf or lip 38 of the platform 30 using a crane or another mover device. For example, a first stone slab 12a can be moved into place by lowering the first slab 12a onto the shelf or lip 38 of the platform 30 and resting an inwardly facing surface of the stone slab 12a against the carrying surface 36 of the platform 30. A second stone slab 12b can then be lowered into place onto the shelf or lip 38 of the platform 30 with an inwardly facing surface of the second stone slab 12b contacting an outwardly facing surface of the first stone slab 12a. The loading process can be repeated until all of the stone slabs 12a, 12b, 12c to be delivered are on the platform 30. As previously described, the platform 30 can be configured to support four 1.5 inch thick stone slabs 12a, 12b, 12c having a total weight of less than about 1,500 pounds. The stone slabs 12a, 12b, 12c can then be secured to the platform 30 using straps, cables, ties, or other fasteners, as are known in the art.

At step 112, the method next includes, with the platform 30 in the vertical or transport position, activating the drive system 18 to move the motorized dolly 10 from the loading location to the installation location. As previously described, the installation location can be an indoor installation location. Therefore, moving the motorized dolly 10 to the installation location can include moving the motorized dolly 10 through doorways, narrow hallways, up or down stairs, and/or around tight turns or stairway landings, which can be accomplished by deploying the turning leg 46 and rotating the base 14 about the turning leg 46.

At step 114, once the motorized dolly 10 arrives at the installation location, the method includes deploying the plurality of outrigger supports 40 to support the base 14. For example, four outrigger supports 40 positioned proximate to corners of the base 14 can be extended away from the base 14, with feet portions of the outrigger supports 40 positioned on the ground surface.

Figure 2C:
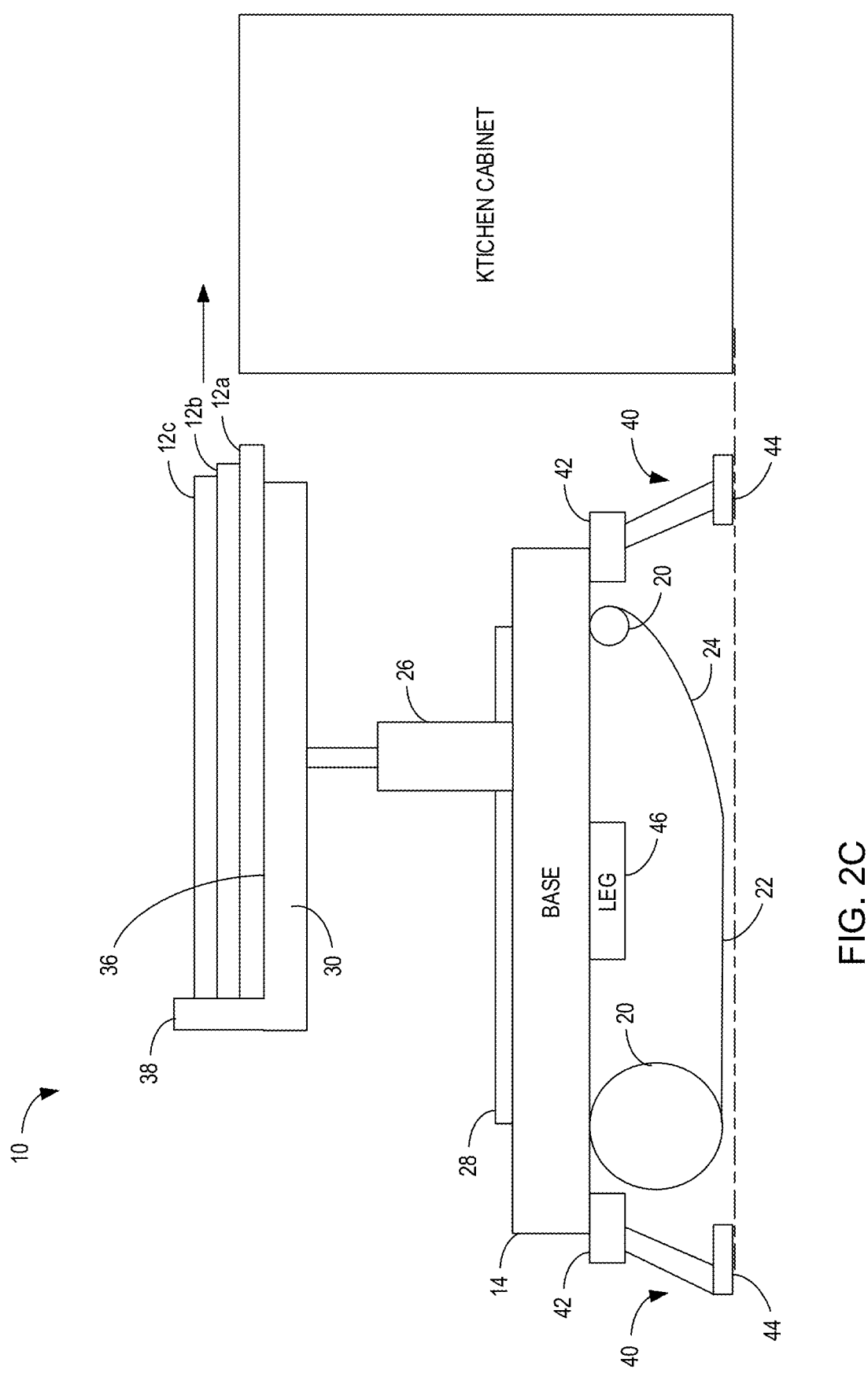
FIG. 2C is a schematic drawing of the motorized dolly of FIG. 2A showing a slab being unloaded from the platform of the motorized dolly.
Figure 2D:
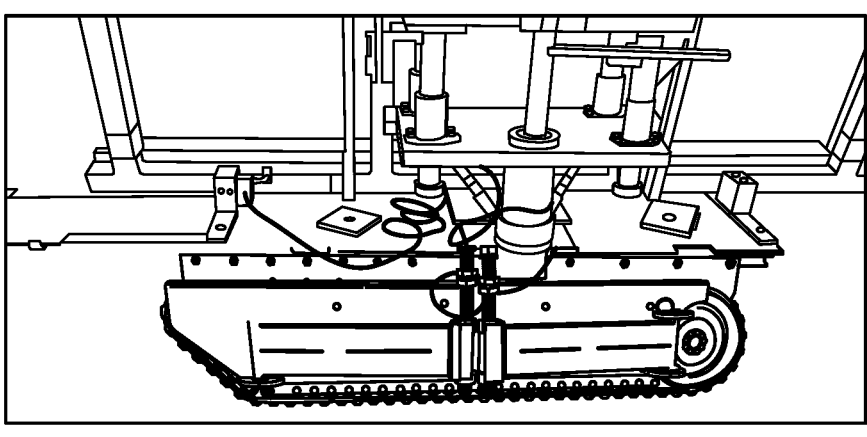
FIGS. 2D-2F are drawings of outrigger supports of a motorized dolly, according to an aspect of the present disclosure.
Figure 2E:
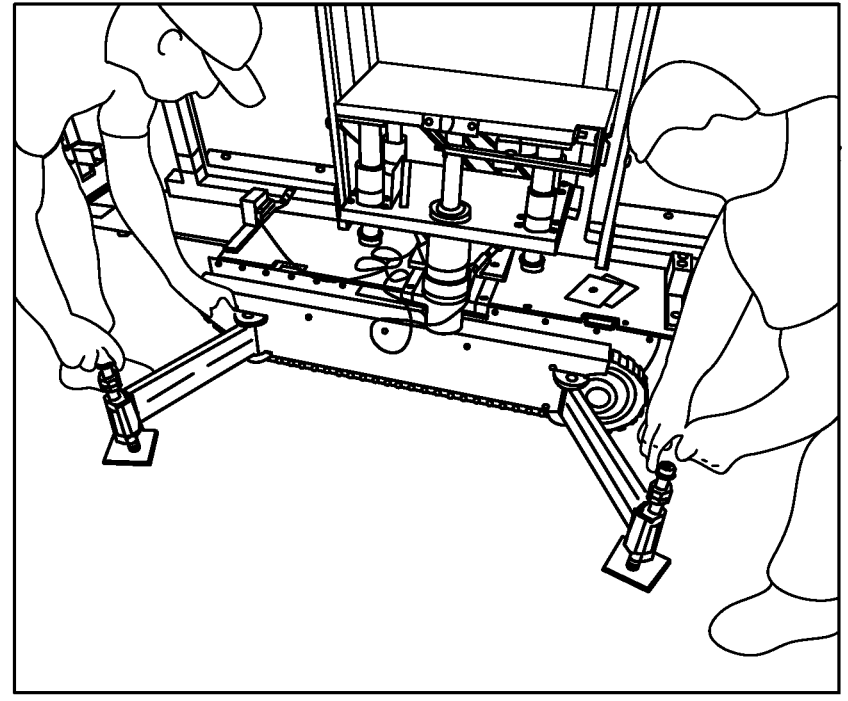
Figure 2F:
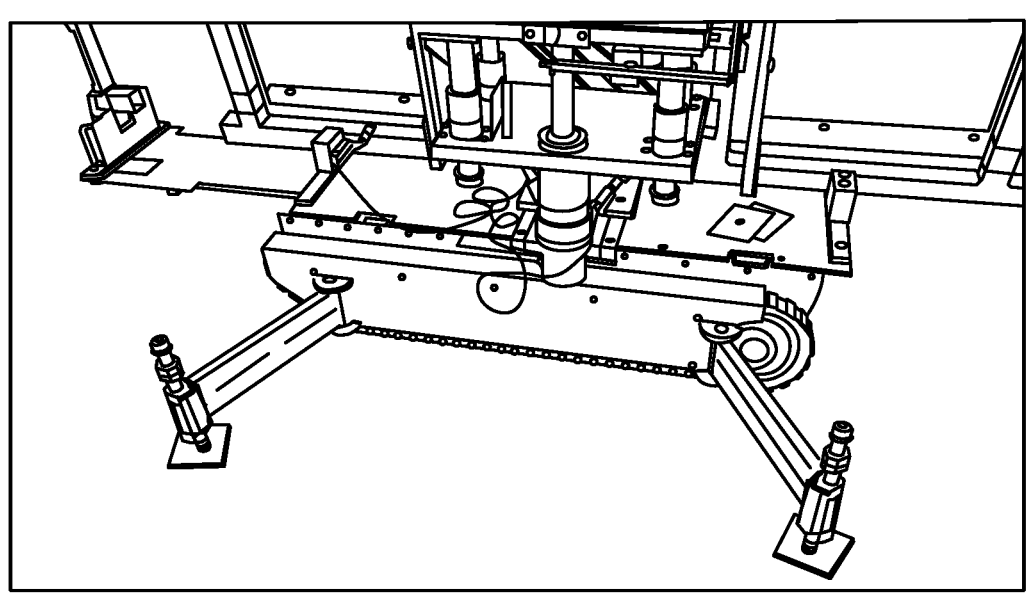
Figure 2G:
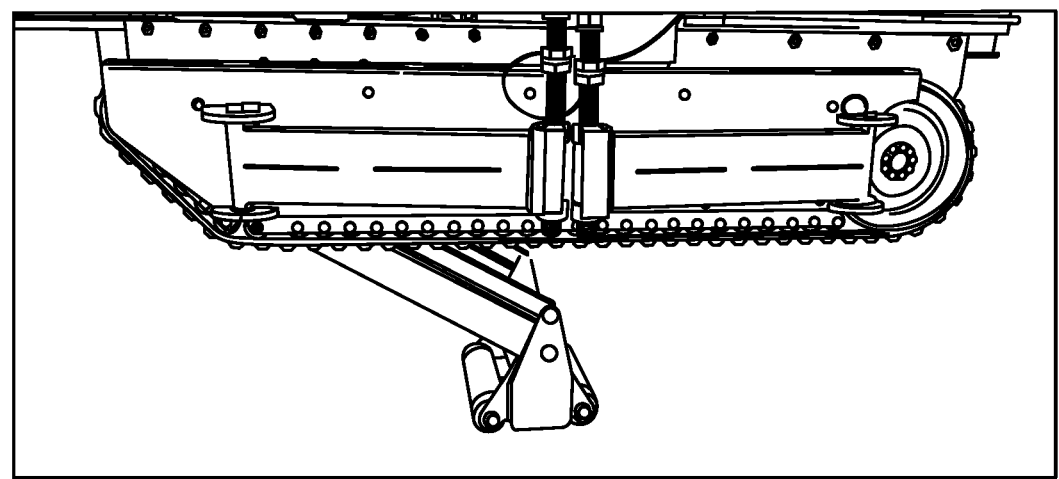
FIG. 2G is a drawing of an example of a motorized dolly with a turning leg in a deployed position, according to an aspect of the present disclosure.

At step 116, the method next includes moving the platform 30 from the transport position (shown in FIG. 2A) to the unloading position (shown in FIGS. 2B and 2C). In some examples, the platform 30 can be moved manually. In other examples, the platform 30 can be moved to the unloading position using the drive system 18. As previously described, moving the platform 30 to the unloading position involves causing the platform 30 to pivot about a connection point with the riser support 26, thereby causing the platform 30 to move from a substantially vertical orientation to a substantially horizontal orientation. With the platform 30 in the horizontal or unloading position, the installer can remove the shelf or lip 38 from the platform 30 so that the stone slabs 12a, 12b, 12c can be unloaded in any direction (i.e., over any side of the platform 30).

At step 118, with the platform 30 in the unloading position, the method further includes extending the riser support 26, such as a hydraulic cylinder, and/or the elevation adjustable outrigger supports 40 to lift the platform 30 and the stone slabs 12a, 12b, 12c secured thereto to an installation height (e.g., to an installation height for a kitchen cabinet or bathroom vanity). Specifically, the installation height can be selected so that a bottom surface of the stone slab 12a, 12b, 12c being installed (e.g., the third stone slab 12c) is aligned with the top of the cabinet or vanity, as shown in FIG. 2C. In that case, the installer(s) can slide the stone slab 12c directly from the platform 30 to the installation location. If the platform includes only one stone slab 12a, then the installation height is a height where the top or carrying surface 36 of the platform 30 aligns with the countertop or vanity. If multiple stone slabs 12a, 12b, 12c or countertop pieces are secured to the platform 30, then the installation height is a height where a top surface of the second slab 12b (i.e., a slab below the slab 12c being installed) is aligned with the top edge of the kitchen cabinet or vanity. At step 120, once the platform 30 is moved to the installation height, the method further comprises sliding the stone slab 12a, 12b, 12c directly from the platform 30 to the installation location. The installer may also rotate the platform 30 about the riser support 26 so that the stone slabs 12a, 12b, 12c can be unloaded from the platform 30 in any desired orientation.

At step 122, after sliding one stone slab 12a, 12b, 12c (e.g., the third stone slab 12c shown in FIG. 2C) from the platform 30 to the installation location, the method can further include installing a second countertop piece, such as the second stone slab 12b) at a second installation location. For example, the method can include moving the motorized dolly 10 to another installation location, such as to a next portion of the kitchen cabinet or vanity intended to receive a countertop piece, and increasing the height of the platform 30 by a distance equal to a thickness of the stone slabs 12a, 12b, 12c. In some examples, the height can be adjusted by elevating the riser support 26 and/or by actuating the elevation adjustable outrigger supports 40 to increase the height of the base 14 and stone slabs 12a, 12b, 12c relative to the ground surface.

After the height of the platform 30 is increased by the appropriate amount, the method further includes sliding the second stone slab 12b from the platform 30 to the second installation location. The method can be repeated until all of the stone slabs 12a, 12b, 12c or countertop pieces secured to the platform 30 of the motorized dolly 10 are delivered to the desired installation locations.

It is to be understood that the invention may assume various alternative variations, except where expressly specified to the contrary. It is also to be understood that the specific devices illustrated in the attached drawings, and described in the specification, are simply exemplary embodiments of the invention. Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope thereof. For example, it is to be understood that the present invention contemplates that, to the extent possible, one or more features of any embodiment can be combined with one or more features of any other embodiment. The embodiments of the invention described herein above in the context of the preferred embodiments are not to be taken as limiting embodiments of the invention to all of the provided details thereof, since modifications and variations thereof may be made without departing from the spirit and scope of the embodiments of the invention.

The invention claimed is:

1. A motorized dolly for transporting at least one slab, the motorized dolly comprising:

a base comprising a plurality of wheels rotatably connected to the base for moving the base along a ground surface;

a drive system comprising at least one motor disposed in the base and coupled to at least one of the plurality of wheels configured to rotate the at least one wheel of the plurality of wheels for forward and backward movement of the base along the ground surface;

a riser assembly connected to the base configured to extend to increase a height of the at least one slab relative to the base and the ground surface and to retract to reduce the height of the at least one slab relative to the ground surface and the base;

a platform pivotally and rotatably connected to the riser assembly configured to receive the at least one slab, wherein the platform pivots relative to the riser assembly to transition the platform between a transport position, where the platform is in a substantially vertical position, and an unloading position, where the platform is in a substantially horizontal position;

a plurality of outrigger supports comprising a first end connected to the base and a second end opposite the first end, the plurality of outrigger supports being configured to be deployed to contact the ground surface for stabilizing the base and the at least one slab received by the platform; and a turning leg rotatably connected to the base and extending downward from a bottom side of the base, the turning leg being transitionable from a retracted position in which the turning leg does not interfere with the forward and backward movement of the base, and an extended position in which the turning leg lifts the base and the plurality of wheels away from the ground surface.

2. The motorized dolly of claim 1, wherein when the turning leg is in the extended position, forward and backward movement of the base along the ground surface is prevented.

3. The motorized dolly of claim 1, further comprising at least one continuous tread track around at least two of the plurality of wheels, wherein rotation of the at least one wheel of the plurality of wheels moves the at least one continuous tread track causing the forward and backward movement of the base along the ground surface.

4. The motorized dolly of claim 1, wherein the base further comprises a track extending substantially parallel to a longitudinal axis of the base, and wherein the riser assembly is slidably connected to the track, such that the riser assembly, the platform, and the at least one slab received by the platform slide along the track in a direction substantially parallel with the longitudinal axis of the base.

5. The motorized dolly of claim 4, wherein sliding the riser assembly along the track repositions a center of gravity of the at least one slab relative to the base.

6. The motorized dolly of claim 1, wherein the drive system further comprises a lifting motor coupled to the riser assembly for extending and/or retracting the riser assembly, thereby changing the height of the at least one slab relative to the base.

7. The motorized dolly of claim 1, wherein the platform comprises interconnected primary members extending in a first direction and secondary members extending in a second direction defining a carrying surface for contacting the at least one slab, which support the at least one slab when the platform is in the unloading position, and a removable lip support along a periphery of the platform for supporting the at least one slab when the platform is in the transport position.

8. The motorized dolly of claim 1, wherein, when deployed, the plurality of outrigger supports stabilize the base preventing the base from tipping over under weight of the at least one slab.

9. The motorized dolly of claim 1, wherein the plurality of outrigger supports are height adjustable configured to extend to lift the base from the ground surface increasing the height of the at least one slab relative to the ground surface.

10. The motorized dolly of claim 1, wherein the first ends of the plurality of outrigger supports are rotatably connected to the base and configured to transition between a retracted position, in which the second ends of the plurality of outrigger supports contact the base, and a deployed position, in which the second ends of the plurality of outrigger supports are rotated away from the base.

11. The motorized dolly of claim 1, further comprising a handle assembly connected to the base, the handle assembly comprising a handle configured to be grasped by a user for guiding forward, backward, and turning movement of the motorized dolly and at least one electronic control for engaging and disengaging the drive system.

12. The motorized dolly of claim 11, wherein the at least one electronic control comprises an input device configured to allow the user to at least one of: control the movement of the motorized dolly, control the riser assembly to adjust the height of the at least one slab, or move the turning leg between the retracted position and the extended position.

13. The motorized dolly of claim 11, wherein the handle assembly further comprises:

a horizontal sliding member slidably connected to the base configured to move into the base, thereby moving the handle towards the base, and out of the base, thereby moving the handle away from the base; and a vertical member connected between a first end of the horizontal sliding member and the handle.

14. The motorized dolly of claim 13, wherein the vertical member is rotatably connected to the first end of the horizontal sliding member, thereby allowing the vertical member and handle connected thereto to move between an end position, in which a longitudinal axis of the vertical member is transverse to a longitudinal axis of the horizontal sliding member, and a side position, in which the longitudinal axis of the vertical member is rotated away from the longitudinal axis of the horizontal sliding member.

15. The motorized dolly of claim 14, wherein, with the vertical member and handle in the side position, the horizontal sliding member can move into the base thereby moving the vertical member and handle towards the base without contacting the at least one slab received by the platform.

16. The motorized dolly of claim 14, wherein the vertical member is pivotally connected to the first end of the horizontal sliding member and configured to pivot about a connection point between the vertical member and the horizontal sliding member, thereby moving the vertical member from a vertical position to an angled position.

17. The motorized dolly of claim 1, wherein, when the turning leg is deployed, the base is configured to rotate about the turning leg by an angular distance of 90 degrees or more.

18. The motorized dolly of claim 1, wherein the riser assembly comprises a hub rotatably connected to the base comprising a first plate, a second plate, and a plurality of posts connected between the first plate and the second plate, wherein the platform is pivotally connected to the hub and comprises a latch configured to engage the first plate of the hub to lock the platform in the unloading position.

19. A method of moving at least one slab with the motorized dolly of claim 1, the method comprising:

securing the at least one slab to the platform;

with the platform in the transport position, activating the drive system and moving the motorized dolly to an installation location;

moving the platform from the transport position to the unloading position;

extending the riser assembly, thereby lifting the platform and the at least one slab to an installation height; and sliding the at least one slab from the platform to the installation location.

20. A motorized dolly for transporting at least one slab, the motorized dolly comprising:

a base comprising a plurality of wheels rotatably connected to the base for moving the base along a ground surface;

a drive system comprising at least one motor disposed in the base and coupled to at least one of the plurality of wheels configured to rotate the at least one wheel of the plurality of wheels for forward and backward movement of the base along the ground surface;

a riser assembly connected to the base configured to extend to increase a height of the at least one slab relative to the base and the ground surface and to retract to reduce the height of the at least one slab relative to the ground surface and the base;

a platform pivotally and rotatably connected to the riser assembly configured to receive the at least one slab, wherein the platform pivots relative to the riser assembly to transition the platform between a transport position, where the platform is in a substantially vertical position, and an unloading position, where the platform is in a substantially horizontal position; and a handle assembly connected to the base, the handle assembly comprising a handle configured to be grasped by a user for guiding forward, backward, and turning movement of the motorized dolly and at least one electronic control for engaging and disengaging the drive system.

\* \* \* \* \*